United States Patent
Piekniewski et al.

(10) Patent No.: US 9,122,994 B2
(45) Date of Patent: Sep. 1, 2015

(54) APPARATUS AND METHODS FOR TEMPORALLY PROXIMATE OBJECT RECOGNITION

(75) Inventors: Filip Lukasz Piekniewski, San Diego, CA (US); Csaba Petre, San Diego, CA (US); Sach Hansen Sokol, La Jolla, CA (US); Botond Szatmary, San Diego, CA (US); Jayram Moorkanikara Nageswaran, San Diego, CA (US); Eugene M. Izhikevich, San Diego, CA (US)

(73) Assignee: Brain Corporation, San Diego, CA (US)

( * ) Notice: Subject to any disclaimer, the term of this patent is extended or adjusted under 35 U.S.C. 154(b) by 976 days.

(21) Appl. No.: 13/152,105

(22) Filed: Jun. 2, 2011

(65) Prior Publication Data
US 2012/0308076 A1    Dec. 6, 2012

(51) Int. Cl.
*G06N 3/04*    (2006.01)

(52) U.S. Cl.
CPC .................................... *G06N 3/049* (2013.01)

(58) Field of Classification Search
None
See application file for complete search history.

(56) References Cited

U.S. PATENT DOCUMENTS

| | | |
|---|---|---|
| 5,063,603 A | 11/1991 | Burt |
| 5,138,447 A | 8/1992 | Shen et al. |
| 5,216,752 A | 6/1993 | Tam |
| 5,272,535 A | 12/1993 | Elabd |
| 5,355,435 A | 10/1994 | DeYong et al. |
| 5,638,359 A | 6/1997 | Peltola et al. |
| 5,652,594 A | 7/1997 | Costas |
| 5,673,367 A | 9/1997 | Buckley |

(Continued)

FOREIGN PATENT DOCUMENTS

| | | |
|---|---|---|
| CN | 102226740 A | 10/2011 |
| JP | 4087423 | 3/1992 |

(Continued)

OTHER PUBLICATIONS

Khotanzad, Alireza. Classification of invariant image representations using a neural network. IEEF. Transactions on Acoustics, Speech, and Signal Processing. vol. 38. No. 6. Jun. 1990, pp. 1028-1038 [online], [retrieved on Aug. 24, 2012]. Retrieved from the Internet <URL: http://www-ee.uta.edu/eeweb/IP/Courses/SPR/Reference/Khotanzad.pdf> p. 1028 col. 2 para 2, p. 1029 col. 1 para 3.

(Continued)

*Primary Examiner* — Thomas Conway
(74) *Attorney, Agent, or Firm* — Gazdzinski & Associates PC

(57) ABSTRACT

Object recognition apparatus and methods useful for extracting information from an input signal. In one embodiment, the input signal is representative of an element of an image, and the extracted information is encoded into patterns of pulses. The patterns of pulses are directed via transmission channels to a plurality of detector nodes configured to generate an output pulse upon detecting an object of interest. Upon detecting a particular object, a given detector node elevates its sensitivity to that particular object when processing subsequent inputs. In one implementation, one or more of the detector nodes are also configured to prevent adjacent detector nodes from generating detection signals in response to the same object representation. The object recognition apparatus modulates properties of the transmission channels by promoting contributions from channels carrying information used in object recognition.

35 Claims, 9 Drawing Sheets

(56) References Cited

U.S. PATENT DOCUMENTS

| | | |
|---|---|---|
| 5,875,108 A | 2/1999 | Hoffberg |
| 6,009,418 A | 12/1999 | Cooper |
| 6,014,653 A | 1/2000 | Thaler |
| 6,035,389 A | 3/2000 | Grochowski |
| 6,418,424 B1 | 7/2002 | Hoffberg et al. |
| 6,458,157 B1 | 10/2002 | Suaning |
| 6,509,854 B1 | 1/2003 | Morita |
| 6,545,705 B1 | 4/2003 | Sigel et al. |
| 6,545,708 B1 | 4/2003 | Tamayama |
| 6,546,291 B2 | 4/2003 | Merfeld et al. |
| 6,581,046 B1 | 6/2003 | Ahissar |
| 6,625,317 B1 | 9/2003 | Gaffin et al. |
| 7,054,850 B2 | 5/2006 | Matsugu |
| 7,580,907 B1 | 8/2009 | Rhodes |
| 7,653,255 B2 | 1/2010 | Rastogi |
| 7,737,933 B2 | 6/2010 | Yamano et al. |
| 7,765,029 B2 | 7/2010 | Fleischer et al. |
| 7,849,030 B2 | 12/2010 | Ellingsworth |
| 8,000,967 B2 | 8/2011 | Taleb |
| 8,015,130 B2 | 9/2011 | Matsugu |
| 8,103,602 B2 | 1/2012 | Izhikevich |
| 8,154,436 B2 | 4/2012 | Szajnowski |
| 8,160,354 B2 | 4/2012 | Paquier |
| 8,200,593 B2 | 6/2012 | Guillen |
| 8,281,997 B2 | 10/2012 | Moran et al. |
| 8,311,965 B2 | 11/2012 | Breitwisch |
| 8,315,305 B2 | 11/2012 | Petre |
| 8,346,692 B2 | 1/2013 | Rouat et al. |
| 8,390,707 B2 | 3/2013 | Yamashita |
| 8,416,847 B2 | 4/2013 | Roman |
| 8,467,623 B2 | 6/2013 | Izhikevich |
| 8,583,286 B2 | 11/2013 | Fleischer et al. |
| 8,712,941 B2 | 4/2014 | Izhikevich et al. |
| 2002/0038294 A1* | 3/2002 | Matsugu ............ 706/20 |
| 2003/0050903 A1 | 3/2003 | Liaw |
| 2003/0216919 A1 | 11/2003 | Roushar |
| 2004/0136439 A1 | 7/2004 | Dewberry |
| 2004/0170330 A1 | 9/2004 | Fogg |
| 2004/0193670 A1 | 9/2004 | Langan et al. |
| 2005/0015351 A1 | 1/2005 | Nugent |
| 2005/0036649 A1 | 2/2005 | Yokono et al. |
| 2005/0283450 A1 | 12/2005 | Matsugu |
| 2006/0094001 A1 | 5/2006 | Torre |
| 2006/0129728 A1 | 6/2006 | Hampel |
| 2006/0161218 A1 | 7/2006 | Danilov |
| 2007/0022068 A1 | 1/2007 | Linsker |
| 2007/0176643 A1 | 8/2007 | Nugent |
| 2007/0208678 A1 | 9/2007 | Matsugu |
| 2008/0100482 A1 | 5/2008 | Lazar |
| 2008/0199072 A1 | 8/2008 | Kondo |
| 2008/0237446 A1 | 10/2008 | Oshikubo |
| 2009/0043722 A1 | 2/2009 | Nugent |
| 2009/0287624 A1 | 11/2009 | Rouat et al. |
| 2010/0036457 A1 | 2/2010 | Sarpeshkar |
| 2010/0081958 A1 | 4/2010 | She |
| 2010/0086171 A1 | 4/2010 | Lapstun |
| 2010/0100482 A1 | 4/2010 | Hardt |
| 2010/0166320 A1 | 7/2010 | Paquier |
| 2010/0225824 A1 | 9/2010 | Lazar |
| 2010/0235310 A1 | 9/2010 | Gage et al. |
| 2010/0299296 A1 | 11/2010 | Modha et al. |
| 2011/0016071 A1 | 1/2011 | Guillen |
| 2011/0119214 A1 | 5/2011 | Breitwisch |
| 2011/0119215 A1 | 5/2011 | Elmegreen |
| 2011/0137843 A1 | 6/2011 | Poon et al. |
| 2011/0160741 A1 | 6/2011 | Asano |
| 2012/0011090 A1 | 1/2012 | Tang |
| 2012/0083982 A1 | 4/2012 | Bonefas |
| 2012/0084240 A1 | 4/2012 | Esser et al. |
| 2012/0109866 A1 | 5/2012 | Modha |
| 2012/0303091 A1 | 11/2012 | Izhikevich |
| 2012/0308076 A1 | 12/2012 | Piekniewski |
| 2012/0308136 A1 | 12/2012 | Izhikevich |
| 2013/0046716 A1 | 2/2013 | Chan et al. |
| 2013/0073484 A1 | 3/2013 | Izhikevich |
| 2013/0073491 A1 | 3/2013 | Izhikevich |
| 2013/0073492 A1 | 3/2013 | Izhikevich |
| 2013/0073495 A1 | 3/2013 | Izhikevich |
| 2013/0073496 A1 | 3/2013 | Szatmary |
| 2013/0073498 A1 | 3/2013 | Izhikevich |
| 2013/0073499 A1 | 3/2013 | Izhikevich |
| 2013/0073500 A1 | 3/2013 | Szatmary |
| 2013/0151450 A1 | 6/2013 | Ponulak |
| 2013/0218821 A1 | 8/2013 | Szatmary |
| 2013/0251278 A1 | 9/2013 | Izhikevich |
| 2013/0297539 A1 | 11/2013 | Piekniewski et al. |
| 2013/0297541 A1 | 11/2013 | Piekniewski et al. |
| 2013/0297542 A1 | 11/2013 | Piekniewski et al. |
| 2013/0325766 A1 | 12/2013 | Petre et al. |
| 2013/0325768 A1 | 12/2013 | Sinyavskiy |
| 2013/0325773 A1 | 12/2013 | Sinyavskiy |
| 2013/0325774 A1 | 12/2013 | Sinyavskiy |
| 2013/0325775 A1 | 12/2013 | Sinyavskiy |
| 2013/0325777 A1 | 12/2013 | Petre et al. |
| 2014/0012788 A1 | 1/2014 | Piekniewski |
| 2014/0016858 A1 | 1/2014 | Richert |
| 2014/0032458 A1 | 1/2014 | Sinyavskiy |
| 2014/0032459 A1 | 1/2014 | Sinyavskiy |
| 2014/0052679 A1 | 2/2014 | Sinyavskiy |
| 2014/0064609 A1 | 3/2014 | Petre et al. |
| 2014/0122397 A1 | 5/2014 | Richert |
| 2014/0122398 A1 | 5/2014 | Richert |
| 2014/0122399 A1 | 5/2014 | Szatmary |
| 2014/0156574 A1 | 6/2014 | Piekniewski |

FOREIGN PATENT DOCUMENTS

| | | |
|---|---|---|
| RU | 2108612 C1 | 10/1998 |
| RU | 2406105 C2 | 12/2010 |
| RU | 2424561 C2 | 7/2011 |
| WO | 2008083335 A2 | 7/2008 |
| WO | 2008132066 A1 | 11/2008 |

OTHER PUBLICATIONS

Schemmel, J., Grubl, A., Meier, K., Mueller, E.: Implementing synaptic plasticity in a VLSI spiking neural network model. In: Proceedings of the 2006 International Joint Conference on Neural Networks (IJCNN'06), IEEE Press Jul. 16-21, 2006, pp. 1-6 [online], [retrieved or Aug. 24, 2012]. Retrieved from the Internet <URL: http://www.kip.uni-heidelberg.de/Veroeffentlichungen/download.cgi/4620/ps/1774.pdf> Introduction.

Pavlidis, NG, Tasoulis, OK, Plagianakos, VP, Nikiforidis, G, Vrahatis MN: Spiking neural network training using evolutionary algorithms. In: Proceedings. 2005 IEEE Internationai Joint Conference on Neural Networks, 2005. IJCNN'05, vol. 4, pp. 2190-2194 Publication Date Jul. 31, 2005 [online], [retrieved on Aug. 24, 2012]. Retrieved from the Internet <URL: http://citeseerx.ist.psu.edu/viewdoc/download-?doi=10.1.1.5.4346&rep=rep1&type=pdf V. Conclusion.

Berkes and Wiskott, Slow feature analysis yields a rich repertoire of complex cell properties. *Journal of Vision* (2005) vol. 5 (6).

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepages,cwi ,n11-sbolltedmblica6ond)hdthesislxif>.

Brette et al., Brian: a simple and flexible simulator for spiking neural networks, The Neuromorphic Engineer, Jul. 1, 2009, pp. 1-4, doi: 10.2417/1200906.1659.

Cessac et al. 'Overview of facts and issues about neural coding by spikes.' Journal of Physiology, Paris 104.1 (2010): 5.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl I):P80.

(56) References Cited

OTHER PUBLICATIONS

Dorval et al. 'Probability distributions of the logarithm of inter-spike intervals yield accurate entropy estimates from small datasets.' Journal of neuroscience methods 173.1 (2008): 129.
Fidjeland et al., Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber=5596678&tag=1.
Field, G.; Chichilnisky, E., Information Processing in the Primate Retina: Circuitry and Coding. *Annual Review of Neuroscience*, 2007, 30(1), 1-30.
Fiete, et al., Spike-Time-Dependent Plasticity and Heterosynaptic Competition Organize Networks to Produce Long Scale-Free Sequences of Neural Activity. *Neuron 65*, Feb. 25, 2010, pp. 563-576.
Floreano et al., 'Neuroevolution: from architectures to learning' Evol. Intel. Jan. 2008 1:47-62, [retrieved Dec. 30, 2013] [retrieved online from URL:<http://inforscience.epfl.ch/record/112676/files/FloreanoDuerrMattiussi2008.p df>.
Földiák, P., Learning invariance from transformation sequences. *Neural Computation*, 1991, 3(2), 194-200.
Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.
Gerstner et al. (1996) A neuronal learning rule for sub-millisecond temporal coding. *Nature* vol. 383 (6595) pp. 76-78.
Gewaltig et al., 'NEST (Neural Simulation Tool)', Scholarpedia, 2007, pp. 1-15, 2(4): 1430, doi: 10.4249/scholarpedia.1430.
Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.
Gluck, Stimulus Generalization and Representation in Adaptive Network Models of Category Learning [online], 1991 [retrieved on Aug. 24, 2013]. Retrieved from the Internet:<URL:http:// www.google.com/url?sa=t&rct=j&q=Giuck+%22STIMULUS+G ENERALIZATION+and+REPRESENTATIO N+1 N+ADAPTIVE+NETWORK+MODELS+OF+CATEGORY+LEARN I NG%22+ 1991.
Gollisch et al. 'Rapid neural coding in the retina with relative spike latencies.' Science 319.5866 (2008): 11 08-1111.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 10.3389/conf.fninf.2011.08.00098.
Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.
Hopfield JJ (1995) Pattern recognition computation using action potential timing for stimulus representation. *Nature* 376: 33-36.
Izhikevich E. M. and Hoppensteadt F.C. (2009) Polychronous Wavefront Computations. *International Journal of Bifurcation and Chaos*. 19:1733-1739.
Izhikevich E.M. (2004) Which Model to Use for Cortical Spiking Neurons? *IEEE Transactions on Neural Networks*, 15:1063-1070.
Izhikevich E.M. (2006) Polychronization: Computation With Spikes. *Neural Computation*,18:245-282.
Izhikevich et al., 'Relating STDP to BCM', Neural Computation (2003) 15, 1511-1523.
Izhikevich, E.M. (2007) Dynamical Systems in Neuroscience: The Geometry of Excitability and Bursting, *The MIT Press*, 2007.
Izhikevich, 'Simple Model of Spiking Neurons', IEEE Transactions on Neural Networks, vol. 14, No. 6, Nov. 2003, pp. 1569-1572.
Janowitz, M.K.; Van Rossum, M.C.W. Excitability changes that complement Hebbian learning. *Network, Computation in Neural Systems*, 2006, 17 (1), 31-41.

Karbowski et al., 'Multispikes and Synchronization in a Large Neural Network with Temporal Delays', Neural Computation 12, 1573-1606 (2000).
Khotanzad, Alireza, Classification of invariant image representations using a neural network, IEEF. Transactions on Acoustics, Speech, and Signal Processing vol. 38 No. 6 Jun. 1990 pp. 1028-1038.
Khotanzad, 'Classification of invariant image representations using a neural network' IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.
Knoblauch, et al. Memory Capacities for Synaptic and Structural Plasticity, *Neural Computation* 2009, pp. 1-45.
Laurent, 'Issue 1—nnql—Refactor Nucleus into its own file—Neural Network Query Language' [retrieved on Nov. 12, 2013]. Retrieved from the Internet: URL:https:// code.google.com/p/nnql/issues/detail?id-1.
Laurent, 'The Neural Network Query Language (NNQL) Reference' [retrieved on Nov. 12, 2013]. Retrieved from the Internet: <URL'https://code.google.com/p/nnql/issues/detail?id=1>.
Lazar et al. 'A video time encoding machine', in Proceedings of the 15th IEEE International Conference on Image Processing (ICIP '08), 2008, pp. 717-720.
Lazar et al.,'Consistent recovery of sensory stimuli encoded with MIMO neural circuits.' Computational intelligence and neuroscience (2010): 2.
Lazar et al. 'Multichannel time encoding with integrate-and-fire neurons.' Neurocomputing 65 (2005): 401-407.
Masquelier and Thorpe, Learning to recognize objects using waves of spikes and Spike Timing-Dependent Plasticity. *Neural Networks* (IJCNN), *The 2010 International Joint Conference on DOI*—10. 1109/IJCNN.2010.5596934 (2010) pp. 1-8.
Masquelier, Timothee. 'Relative spike time coding and STOP-based orientation selectivity in the early visual system in natural continuous and saccadic vision: a computational model.' Journal of computational neuroscience 32.3 (2012): 425-441.
Meister, M., Multineuronal codes in retinal signaling. *Proceedings of the National Academy of sciences*. 1996, 93, 609-614.
Meister, M.; Berry, M.J. The neural code of the retina, *Neuron*. 1999, 22, 435-450.
Nichols, A Re configurable Computing Architecture for Implementing Artificial Neural Networks on FPGA, Master's Thesis, The University of Guelph, 2003, pp. 1-235.
Oster M., Lichtsteiner P., Delbruck T, Liu S. A Spike-Based Saccadic Recognition System. *ISCAS 2007. IEEE International Symposium on Circuits and Systems*, 2009, pp. 3083-3086.
Paugam-Moisy et al. 'Computing with spiking neuron networks.' Handbook of Natural Computing, 40 p. Springer, Heidelberg (2009).
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.
Rekeczky, et al., "Cellular Multiadaptive Analogic Architecture: A Computational Framework for UAV Applications." May 2004.
Revow M., Williams C., and Hinton, G.E., 1996, Using Generative Models for Handwritten Digit Recognition, *IEEE Trans. on Pattern Analysis and Machine Intelligence*, 18, No. 6, Jun. 1996.
Sanchez, Efficient Simulation Scheme for Spiking Neural Networks, *Doctoral Thesis, Universita di Granada* Mar. 28, 2008, pp. 1-104.
Sato et al., 'Pulse interval and width modulation for video transmission.' Cable Television, IEEE Transactions on 4 (1978): 165-173.
Schemmel, J., et al. Implementing synaptic plasticity in a VLSI spiking neural network model, Proceedings of the 2006 International Joint Conference on Neural Networks, Jul. 2006 pp. 1-6.
Schnitzer, M.J.; Meister, M.; Multineuronal Firing Patterns in the Signal from Eye to Brain. *Neuron*, 2003, 37, 499-511.

(56) References Cited

OTHER PUBLICATIONS

Serrano-Gotarredona, et al, "On Real-Time: AER 2-D Convolutions Hardware for Neuromorphic Spike-based Cortical Processing", Jul. 2008.
Simulink.Rtm. model [online], [Retrieved on Dec. 10, 2013] Retrieved from <URL: http://www.mathworks.com/ products/simulink/index.html>.
Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).
Sjostrom et al., 'Spike-Timing Dependent Plasticity' Scholarpedia, 5(2):1362 (2010), pp. 1-18.
Szatmary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371 %2Fjournal.pcbi.10008 79#>.
Thomas S. and Riesenhuber, M, 2004, Realistic Modeling of Simple and Complex Cell Tuning in the HMAX Model, and Implications for Invariant Object Recognition in Cortex, *AI Memo* 2004-017 Jul. 2004.
Thorpe, S.J., Delorme, A. & Vanrullen, R. (2001). Spike-based strategies for rapid processing. *Neural Networks* 14, pp. 715-725.
Thorpe, S.J., Guyonneau, R., Guilbaud, N., Allegraud, J-M. & Vanrullen, R. (2004). SpikeNet: real-time visual processing with one spike per neuron. *Neurocomputing*, 58-60, pp. 857-864.
Tim Gollisch and Markus Meister (2008) Rapid Neural Coding in the Retina with Relative Spike Latencies. *Science* 319:1108-1111.
Van Rullen R.; Thorpe, S. Rate Coding versus temporal order coding: What the Retinal ganglion cells tell the visual cortex. *Neural computation*, 2001, 13, 1255-1283.
Vanrullen, R. & Koch, C. (2003). Is perception discrete or continuous? *Trends in Cognitive Sciences* 7(5), pp. 207-213.
Vanrullen, R., Guyonneau, R. & Thorpe, S.J. (2005). Spike times make sense. *Trends in Neurosciences* 28(1).
Wallis, G.; Rolls, E. T. A model of invariant object recognition in the visual system. *Progress in Neurobiology*. 1997, 51, 167-194.
Wang, 'The time dimension for scene analysis.' Neural Networks, IEEE Transactions on 16.6 (2005): 1401-1426.
Wiskott, L.; Sejnowski, T.J. Slow feature analysis: Unsupervised learning of invariances. *Neural Computation*, 2002, 14, (4), 715-770.
Zarandy, et al., "Bi-i: A Standalone Ultra High Speed Cellular Vision System", Jun. 2005.
Stringer, et al., "Invariant Object Recognition in the Visual System with Novel Views of 3D Objects", 2002, 2585-2596, 12 pages.
Wiskott, et al., "Slow Feature Analysis", 2002, 29 pages.
Ramachandran, et al., "The Perception of Phantom Limbs", The D.O. Hebb Lecture, Center for Brain and Cognition, University of California, 1998, 121, 1603-1630, 28 pages.
Brette, et al., "Simulation of Networks of Spiking Neurons: A Review of Tools and Strategies", Received Nov. 29, 2006, Revised Apr. 2, 2007, Accepted Apr. 12, 2007, Springer Science, 50 pages.
Izhikevich E.M., "Neural Excitability, Spiking and Bursting", Neurosciences Institute, Received Jun. 9, 1999, Revised Oct. 25, 1999, 1171-1266, 96 pages.
Kazantsev, et al., "Active Spike Transmission in the Neuron Model With a Winding Threshold Maniford", Jan. 3, 2012, 205-211, 7 pages.
Kling-Petersen, PhD, "Sun and HPC: From Systems to PetaScale" Sun Microsystems, no date, 31 pages.
Martinez-Perez, et al., "Automatic Activity Estimation Based on Object Behavior Signature", 2010, 10 pages.
Matsugu, et al., "Convolutional Spiking Neural Network for Robust Object Detection with Population Code Using Structured Pulse Packets", 2004, 39-55, 17 pages.

* cited by examiner

APPARATUS AND METHODS FOR TEMPORALLY PROXIMATE OBJECT RECOGNITION

CROSS-REFERENCE TO RELATED APPLICATIONS

This application is related to co-owned U.S. provisional patent application No. 61/318,191, filed Mar. 26, 2010 and entitled "APPARATUS AND METHOD FOR PULSE-CODE INVARIANT OBJECT RECOGNITION", U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010 and entitled "Invariant Pulse Latency Coding Systems and Methods", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed contemporaneously herewith on Jun. 2, 2011 and entitled "APPARATUS AND METHODS FOR PULSE-CODE INVARIANT OBJECT RECOGNITION", and U.S. patent application Ser. No. 13/152,119, filed contemporaneously herewith on Jun. 2, 2011 and entitled "SENSORY INPUT PROCESSING APPARATUS AND METHODS", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to object recognition and identification in a computerized processing system, and more particularly in one exemplary aspect to a computer vision apparatus and methods of temporally proximate object recognition.

2. Description of Related Art

Object recognition in the context of computer vision relates to finding a given object in an image or a sequence of frames in a video segment. Typically, temporally proximate features that have high temporal correlations are identified within the sequence of frames, with each successive frame containing a temporally proximate representation of an object. Object representations, also referred to as the "view", may change from frame to frame due to a variety of object transformations, such as rotation, movement/translation, change in lighting, background, noise, appearance of other objects, partial blocking/unblocking of the object, etc. Temporally proximate object representations occur when the frame rate of object capture is commensurate with the timescales of these transformations, so that at least a subset of a particular object representation appears in several consecutive frames. Temporal proximity of object representations allows a computer vision system to recognize and associate different views with the same object (for example, different phases of a rotating triangle are recognized and associated with the same triangle). Such temporal processing (also referred to as learning), enables object detection and tracking based on an invariant system response with respect to commonly appearing transformations (e.g., rotation, scaling, and translation).

Although temporal correlation between successive frames are reduced by discontinuities, sudden object movements, and noise, temporal correlations are typically useful for tracking objects evolving continuously and slowly, e.g., on time scales that are comparable to the frame interval, such as tracking human movements in a typical video stream of about 24 frames per second (fps).

Most existing approaches to binding (associating) temporarily proximate object features from different frames rely on the rate based neural models (see, e.g., Földiák, P. Learning invariance from transformation sequences. *Neural Computation*, 1991, 3(2), 194-200) with a modified Hebbian learning rule, also referred to as the "trace rule". Hebbian models postulate that memory is stored in the synaptic weights, and learning is the process that changes those weights. The trace rule is found to produce invariant representations of simple objects (Wallis, G.; Rolls, E. T. A model of invariant object recognition in the visual system. *Progress in Neurobiology.* 1997, 51, 167-194). Similar concepts have been used in Slow Features Analysis approach as described by (Wiskott, L.; Sejnowski, T. J. Slow feature analysis: Unsupervised learning of invariances. *Neural Computation,* 2002, 14, (4), 715-770) and (Janowitz, M. K.; Van Rossum, M. C. W. Excitability changes that complement Hebbian learning. Network, *Computation in Neural Systems,* 2006, 17 (1), 31-41), who showed that excitability changes in a processing unit can complement Hebbian learning to bind associations between successive image frames.

However, most of the existing "brain inspired" computer vision models rely either on modeling computational blocks which do not correspond to neurons (rather, e.g. whole functional circuits), or even if they do model individual neurons, then usually so-called rate based models are used, wherein information about objects is encoded into a dimensionless firing rate, characterized by neuron spike count or by a mean neuron firing rate. An object (and/or object feature) is detected based on matching of an observed rate to a predetermined value associated with the object representation. As a result, in order to encode and recognize different representation of the same object (i.e., a bar of different lengths), the existing methods require different detector nodes that each specialize in a single object representation. Invariably, such systems scale poorly with an increase in the number of objects, their variety and complexity. Additionally, the use of specialized detectors without detector reuse requires detection apparatus with an increased numbers of detectors in order to perform detection of more complex objects. Furthermore, such rate-based approaches merely encode data frames into dimensionless activity of detector nodes, while completely neglecting accounting for the short-term temporal interactions between nodes.

Accordingly, there is a salient need for a more efficient and scalable computerized object recognition solution that utilizes component reuse, lowers cost and reduces complexity, yet which is capable of dealing with many objects and their transformations.

SUMMARY OF THE INVENTION

The present invention satisfies the foregoing needs by providing, inter alia, apparatus and methods for temporally proximate object recognition.

In one aspect of the invention, an image processing apparatus is disclosed. In one embodiment, the apparatus includes a receiver configured to receive a sequence of image frames comprising an object undergoing a transformation, an encoder configured to encode at least a portion of an image frame within the sequence of image frames into a group of pulses, and a detector. The detector is in one variant coupled by a plurality of transmission channels to the encoder and is configured to receive the group of pulses, and to generate a detection signal based at least in part on the group of pulses such that excitability parameter of the detector is configurable to be increased above a reference value responsive to generation of the detection signal. A gain of at least one of the plurality of transmission channels is configurable to be adjusted from a first value to a second value responsive to an arrival of at least one pulse of the group of pulses at the detector within a time interval relative to the detection signal. The excitability parameter and the gain of at least one of the plurality of transmission channels cooperate to effect recognition of the object in the image frame of the sequence of image frames invariantly with respect to the transformation.

In another variant, value of the second gain is configured based at least in part on the time between the detection signal and the at least one pulse such that the second value is greater than the first value responsive to the at least one pulse arriving at the detector prior to the detection signal, and the second value is less than the first value responsive to the at least one pulse arriving at the detector subsequent to the detection signal.

In another aspect of the invention, an apparatus configured for object recognition is disclosed. In one embodiment, the apparatus comprises a receiving module configured to receive a first plurality of frames relating to an object undergoing a transformation, an encoder configured to encode at least a portion of a frame within the first plurality of frames into a group of pulses, and at least one detector in communication with the encoder. In one variant, the detector is configured to receive the group of pulses, and to generate a first signal based at least in part on the group of pulses such that at least a subset of the first plurality of frames comprises a plurality of views of the object undergoing the transformation; the apparatus is configured to recognize the object in a view of the plurality of views invariantly with respect to the transformation.

In another variant, the at least one detector comprises a first detector and a second detector, and the first detector is configurable to be adjusted from a first regime to a second regime responsive to a second signal associated with the second detector such that the second regime is configured based at least in part on a value associated with the second signal, the fourth regime comprising one of: (i) a detection inhibition regime, and (ii) detection enhancement regime.

In yet another variant, the at least one detector is adjustable from a first regime to a second regime responsive to a second signal such that the second signal comprises a detection signal generated in response to a first frame of the first plurality of frames, and the first regime comprises a first parameter and the second regime comprises a second parameter, the second parameter configured substantially different from the first parameter until at least receiving of a second frame of the first plurality of frames, the second frame being generated subsequent to the first frame.

In still another variant, the least one detector is further configurable to be adjusted from a third regime a fourth regime based at least in part on a second detection signal, the second detection signal being generated responsive to a second plurality of frames, the second plurality of frames temporally preceding the first plurality of frames.

In a further variant, the apparatus further comprises a plurality of transmission channels coupled between the at least one detector and the encoder, and logic configured to adjust at least one of the plurality of transmission channels from a first scheme to a second scheme based at least in part on the second detection signal being generated.

In another embodiment, the apparatus includes an encoder configured to receive a first plurality of views of an object undergoing a transformation, and to encode at least a portion of a first view of the first plurality of views into a group of pulses. The apparatus further includes a first detector configured to generate a detection signal based at least in part on the receiving the group of pulses, such that the first detector is adjustable from a first regime to a second regime responsive to a receipt of a pulse of the group of pulses; the apparatus is configured to recognize the object in the first view of the first plurality of views invariantly with respect to the transformation.

In one variant, the detection signal is generated in response to the first view of the first plurality of views, and the first regime comprises a first parameter and the second regime comprises a second parameter, the second parameter configured substantially different from the first parameter until at least a receiving of a second view of the first plurality of views, the second view being received subsequent to the first view.

In another embodiment, the apparatus further comprises a plurality of channels coupled between the first detector and the encoder. In one variant, the apparatus comprises logic configured to adjust at least one of the plurality of channels from a first scheme to a second scheme responsive to an arrival of at least one pulse of the group of pulses at the first detector via the at least one of the plurality of channels within a first time interval relative to the signal. The adjustment from the first scheme to the second scheme is in one variant configured based at least in part on the interval such that the first scheme is characterized by a first channel gain, and the second scheme is characterized by second channel gain.

In another variant, the apparatus comprises logic configured to adjust at least one of the plurality of channels from a first scheme to a second scheme based at least in part on a second detection signal, the second detection signal being generated responsive to a second plurality of views. The second plurality of views temporally precedes the first plurality of views such that the adjustment of the at least one of the plurality of channels is effected responsive to generation of the second detection signal.

In another embodiment, the apparatus further comprises a second detector; the first detector is configurable to be adjusted from a third regime to a fourth regime responsive to a signal associated with the second detector such that the fourth regime is configured based at least in part on a value associated with the signal, the fourth regime comprising one of (i) a detection inhibition regime, and (ii) detection enhancement regime.

In a third aspect of the invention, a computer readable apparatus is disclosed. In one embodiment, the apparatus comprises non-transient data stored thereon, the data being generated via a computerized apparatus configured to process a plurality of frames relating to an object undergoing a transformation. The plurality of frames are received by a detector apparatus of the computerized apparatus in communication with a plurality of communication channels according to a method comprising, receiving a first group of pulses via at least a subset of the plurality of communication channels, the first group of pulses associated with a first view of the object, generating a detection signal based at least in part on the receiving, and adjusting at least one communication channels within the subset from a first scheme to a second scheme responsive to the detection signal so that the generating and adjusting cooperate to effect recognition of the object in the first view invariantly with respect to the transformation.

In a fourth aspect of the invention, a method for use in a computerized apparatus configured to process a first plurality of frames comprising views of an object undergoing a transformation is disclosed. In one embodiment, the first plurality of frames are being received by a detector apparatus in communication with a plurality of channels, and the method comprises generating a detection signal responsive to receiving a first group of pulses via the plurality of channels, the first group associated with a first view of the object, and adjusting at least one of the channels from a first scheme to a second scheme responsive to the detection signal, such that the generating and adjusting cooperate to effect recognition of the object in the first view. In one variant, the recognition is invariant with respect to the transformation.

In another variant, the method comprises adjusting the detector apparatus from a first regime to a second regime responsive to a signal.

In yet another variant, the method comprises adjusting the detector apparatus from a third regime a fourth regime based at least in part on a second detection signal, the second detection signal being generated responsive to a second plurality of frames relating to the object undergoing the transformation such that the second plurality of frames temporally preceding the first plurality of frames.

In still another variant, the method comprises adjusting at least one of the plurality of the channels from a third scheme to a fourth scheme responsive to an arrival of at least one pulse of the group of pulses at the detector apparatus via said at least one of the plurality of channels within a first interval relative to the signal, such that the adjustment from the first scheme to the fourth scheme is configured based at least in part on the interval.

Further features of the present invention, its nature and various advantages will be more apparent from the accompanying drawings and the following detailed description.

Figure 1:
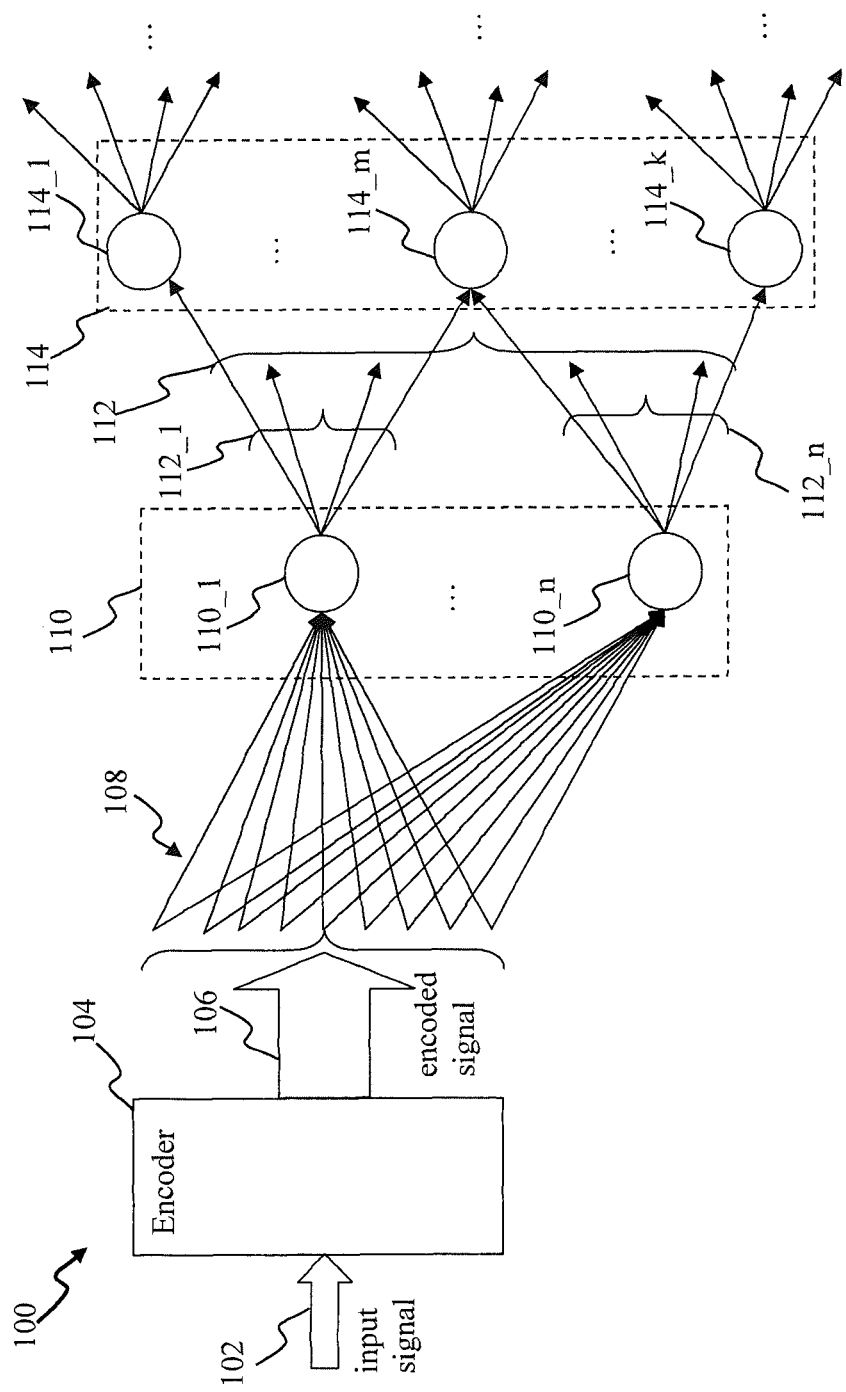
FIG. 1 is a block diagram illustrating an exemplary object recognition apparatus according to one embodiment of the invention.

All Figures disclosed herein are © Copyright 2011 Brain Corporation. All rights reserved.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment; other embodiments are possible by way of interchange of, or combination with, some or all of the described or illustrated elements. Wherever convenient, the same reference numbers will be used throughout the drawings to refer to same or like parts.

Where certain elements of these embodiments can be partially or fully implemented using known components, only those portions of such known components that are necessary for an understanding of the present invention will be described, and detailed descriptions of other portions of such known components will be omitted so as not to obscure the invention.

In the present specification, an embodiment showing a singular component should not be considered limiting; rather, the invention is intended to encompass other embodiments including a plurality of the same component, and vice-versa, unless explicitly stated otherwise herein.

Further, the present invention encompasses present and future known equivalents to the components referred to herein by way of illustration.

As used herein, the terms "computer", "computing device", and "computerized device", include, but are not limited to, mainframe computers, workstations, servers, personal computers (PCs) and minicomputers, whether desktop, laptop, or otherwise, personal digital assistants (PDAs), handheld computers, embedded computers, programmable logic devices, digital signal processor systems, personal communicators, tablet computers, portable navigation aids, J2ME equipped devices, cellular telephones, smartphones, personal integrated communication or entertainment devices, neurocomputers, neuromorphic chips, or literally any other device capable of executing a set of instructions and processing an incoming data signal.

As used herein, the term "computer program" or "software" is meant generally to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the terms "connection", "link", "transmission channel", "delay line", "wireless" refers without limitation to a causal link between any two or more entities (whether physical or logical/virtual), which enables information exchange between the entities.

As used herein, the term "invariant" is meant generally to refer to, without limitation, the response of a recognition system or its components that is not substantially different when one or more parameters of the incoming signal are varied. For example, the system, or some of its subsystems, may generate a complex pattern of pulses in response to an input signal, and changing parameters of the signal would not change substantially the pattern of pulses, but only affect the time of its generation.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), memristor, and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein the terms "pulse pattern", "pattern of pulses", or "pattern of pulse latencies" are meant generally and without limitation to denote a set of pulses, arranged (in space and time) in a predictable manner that is recognizable at a predetermined level of statistical significance.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software representation of a latency or timing of the pulse, and any other pulse or pulse type associated with a pulsed transmission system or mechanism.

As used herein, the terms "pulse latency", "absolute latency", and "latency" are meant generally to refer to, without limitation, a temporal delay or a spatial offset between an event (e.g., the onset of a stimulus, an initial pulse, or just a point in time) and a pulse.

As used herein, the terms "pulse group latency", or "pulse pattern latency" refer to, without limitation, an absolute latency of a group (pattern) of pulses that is expressed as a latency of the earliest pulse within the group.

As used herein, the terms "relative pulse latencies" refer to, without limitation, a latency pattern or distribution within a group (or pattern) of pulses that is referenced with respect to the pulse group latency.

As used herein, the term "pulse-code" is meant generally to denote, without limitation, information encoding into a patterns of pulses (or pulse latencies) along a single pulsed channel or relative pulse latencies along multiple channels.

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, Long Term Evolution (LTE) or LTE-Advanced (LTE-A), analog cellular, CDPD, satellite systems such as GPS, millimeter wave or microwave systems, optical, acoustic, and infrared (i.e., IrDA).

Overview

The present invention provides, in one salient aspect, apparatus and methods for detecting and recognizing objects invariantly with respect to one or more temporally proximate object transformations. These transformations may include, inter alia, rotation, translation, position change, and scaling. Many other transformations useful with the invention exist, such as for example pitch change for object/feature recognition in sound signals, texture for tactile signals, and/or transparency and color for visual objects. Temporally proximate time scales are determined by, inter alia, the nature of the object and its transformations, and typically require a time period sufficient to capture adequate information about the object. By way of example, when processing visual images containing people in applications such as surveillance or human-computer interaction, such time scales are typically on the order of 0.1-0.3 seconds (s), which translates into 2-7 frames at a typical rate of 24 frames per second (fps).

In one implementation of the invention, the incoming signal is encoded to produce a pulse-code output that depends only on the predetermined object type. Invariant representations of features and objects emerge from the temporal proximity of different transformations of these features, and objects in the input. The encoded signal is transmitted from the encoder to one or more detectors over a plurality of transmission channels. Each detector is configured to generate a detection signal upon recognizing the predetermined representation of the object in the encoded signal.

Another implementation of the presented invention uses pulse timing-dependent plasticity, wherein the response of detectors and/or transmission channels is dynamically adjusted based in part on prior detector activity and/or a prior input. Transmission characteristics of different channels (for example, the conduction delay or the strength of transmission describing the strength of the impact of the incoming pulse onto the receiving unit), are adaptively adjusted based on prior input signals (history), so that the detection apparatus acquires, through learning and adaptation, invariant recognition properties initially not present.

In yet another implementation, the pattern of relative pulse latencies is generated in the pulsed output signal upon the occurrence of one or more of cyclic events, such as a clock signal, an internally generated oscillatory wave, an arrival of the input frame, an appearance of a new feature in the frame, and/or a time related to a previous event.

In another aspect of the invention, the detector nodes are configurable to interact with each other on comparatively short time scales. For example, a detector that is the first to recognize the object of interest transmits an indication to neighboring detectors, the indication configured to prevent the other nodes from generating detection signals.

In another implementation, portions of the object recognition apparatus are embodied in a remote server, comprising a computer readable apparatus.

Embodiments of object recognition functionality of the present invention are useful in a variety of applications including for instance a prosthetic device, autonomous robotic apparatus, and other electromechanical devices requiring object recognition functionality.

Detailed Description of Exemplary Embodiments

Detailed descriptions of the various embodiments and variants of the apparatus and methods of the invention are now provided. Although certain aspects of the invention can best be understood in the context of conversion of visual input into pulse code output and subsequent detection of objects of interest in a temporally proximate sequence of frames invariant to object transformations (such as rotation, lighting changes, etc.), embodiments of the invention may also be used for processing of signals of other, often non-visual modalities, including various bands of electromagnetic waves (microwave, x-ray, infrared, etc.) and pressure (sound, seismic, tactile) signals.

Embodiments of the invention may be, for example, deployed in a hardware and/or software implementation of a computer-vision system, provided in one or more of a prosthetic device, robotic device and any other specialized visual system. In one such implementation, an image processing system may include a processor embodied in an application specific integrated circuit ("ASIC"), which can be adapted or configured for use in an embedded application such as a prosthetic device.

Exemplary Encoding Apparatus and Methods

Referring now to FIGS. 1 through 4, exemplary embodiments of the pulse-code temporally proximate object recognition apparatus and methods of the invention are excita described.

Apparatus and methods that produce invariant response based on temporal proximity of object representations are described in detail with respect FIG. 1. The image processing apparatus 100 includes an encoder 104 configured to receive an input signal 102. In one embodiment shown and described with respect to FIG. 1A below, the input signal is presented as a sequence of frames. The input signal in this case is a sequence of images (image frames) received from a CCD camera via a receiver apparatus or downloaded from a file. Alternatively, the image is a two-dimensional matrix of RGB values refreshed at a 24 Hz frame rate. It will be appreciated by those skilled in the art that the above image parameters are merely exemplary, and many other image representations (e.g., bitmap, CMYK, grayscale, etc.) and/or frame rates are equally useful with the present invention.

The encoder 104 transforms (encodes) the input signal into an encoded signal 106. In one variant, the encoded signal comprises a plurality of pulses (also referred to as a group of pulses) configured to model neuron behavior. It is known in the field of neuroscience that neurons generate action potentials, often called "spikes", "impulses", or "pulses" and transmit them to other neurons. Individual pulses within the pulse group, typically last on the order of 1-2 ms and are approximated by discrete temporal events. In a different approach, each individual pulse of the pulse group is composed of several individual pulses (spikes).

The encoded signal is transmitted from the encoder 104 via multiple communication links (also referred to as transmission channels, or communication channels) 108 to one or more detectors (also referred to as the pulse receiving unit, the detector node, or the receiving unit) of the first detector bank 110.

In the embodiment of FIG. 1, different detector nodes of the same bank are denoted by a "_n" designator, such that e.g., the designator 110_1 denotes the first detector of the detector bank 110. Although only two detectors (110_1, 110_n) are shown in the embodiment of FIG. 1 for clarity, it is appreciated that a single encoder can be coupled to any number of detector nodes that is compatible with the detection apparatus hardware and software limitations. Furthermore, a single detector node may be coupled to any practical number of encoders.

In one embodiment, each of the detectors 110_1, 110_n contains logic (which may be implemented as a software code, hardware logic, or a combination of thereof) configured to recognize a predetermined pattern of pulses in the encoded signal 106, using any of the mechanisms described below, and to produce detection output signals transmitted over communication channels 112. In FIG. 1, the designators 112_1, 112_n denote output of the detectors 110_1, 110_n, respectively.

In one implementation, the detection signals are delivered to a downstream bank of detectors 114 (that includes several detectors 114_1, 114_m, 114_k) for recognition of complex object features and objects, similar to the exemplary embodiment described in commonly owned and co-pending U.S. patent application Ser. No. 13/152,084 entitled "Apparatus and Methods for Pulse-Code Invariant Object Recognition", filed contemporaneously herewith, and incorporated herein by reference in its entirety. In this implementation, each subsequent bank of detectors is configured to receive signals from the previous bank, and to detect more complex (compared to the featured detected by the preceding detector bank) features and objects. For example, a bank of edge detectors is followed by a bank of bar detectors, followed by a bank of corner detectors and so on, thereby enabling alphabet recognition by the apparatus.

The presented hierarchy is only an example and does not have to be strict, detectors may be interconnected with loops and detection of features can be intermixed. In general however the further the detector in terms of number of intermediate detectors from the set of encoders, the more complex feature of the input is likely to be a subject of detection.

Each of the detectors within upstream detector bank 110 generates detection signals on communication channels 112_1, 112_n (with appropriate latency) that propagate with different conduction delays to the detectors of the downstream bank of detectors 114. The detector cascade of the embodiment of FIG. 1 may contain any practical number of detector nodes and detector banks determined, inter alia, by the software/hardware resources of the detection apparatus and complexity of the objects being detected.

Figure 1A:
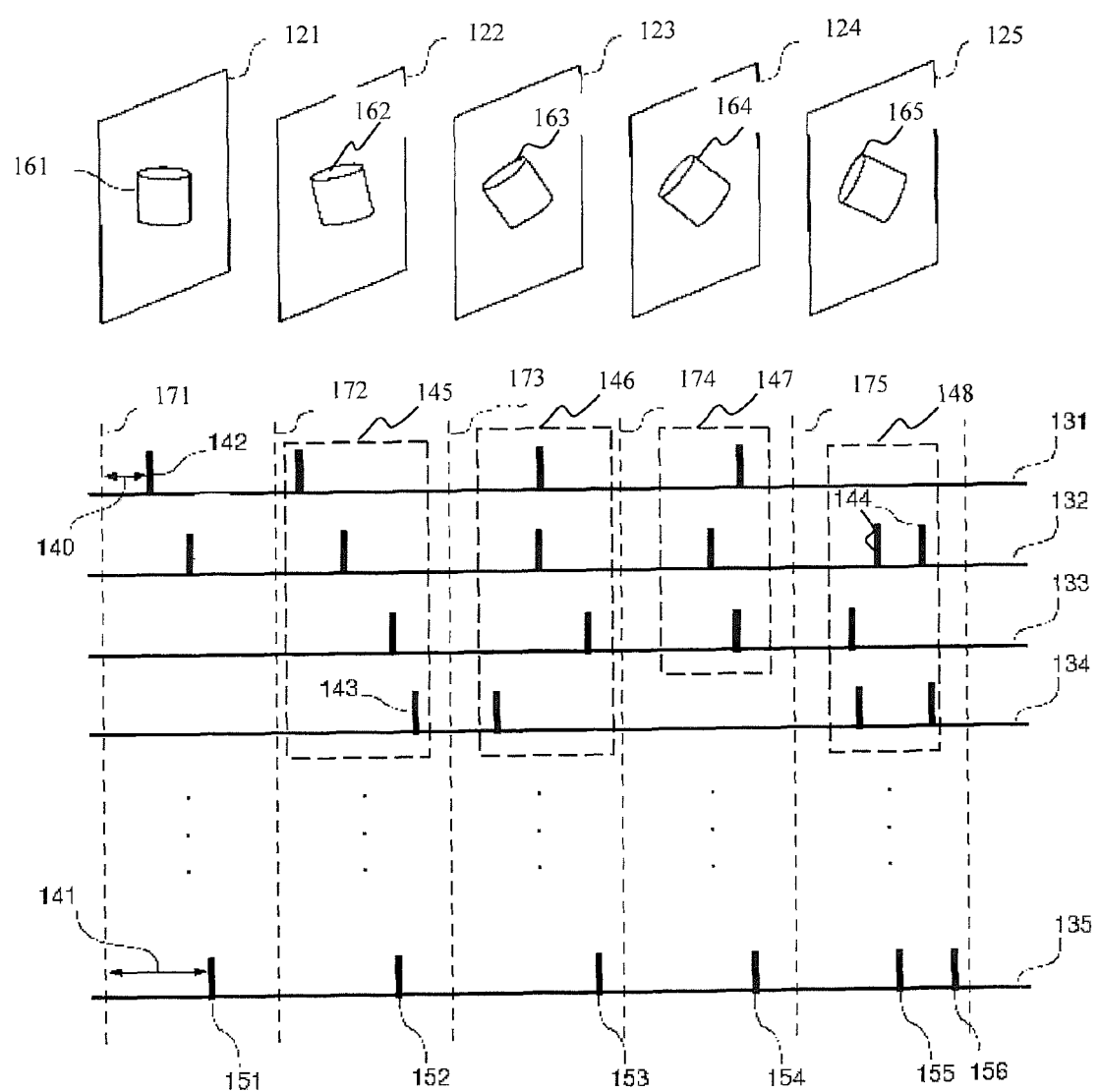
FIG. 1A is a graphical representation illustrating encoding of an input signal into a pattern of pulses, and a sample response of the detector node, according to one embodiment of the invention.

Referring now to FIG. 1A, one exemplary embodiment of the object recognition apparatus of FIG. 1 operation is described in detail. In the embodiment of FIG. 1A, the input signal includes a sequence of frames 121-125. Each of the frames 121-125 is encoded into a respective group of pulses (e.g., pulse groups 146, 147 corresponding to the frames 123, 124, respectively, in FIG. 1). The encoded pulses 142-144 are transmitted along respective communication channels 131-134 using e.g., any of the mechanisms described below.

Pulse latency is determined in the illustrated embodiment as a temporal delay between a reference event and an arrival of the pulse along a channel (e.g., line 140 denotes the latency of pulse 142 corresponding to the frame 121 in FIG. 1A). Pulse latency is measured with respect to the corresponding frame, as denoted by vertical broken lines 171-175.

For example, latency for each pulse within the pulse group 147 is configured with respect to the onset of the frame 174. In another embodiment (not shown), an event trigger, such as sudden change in the visual signal (e.g., due to a visual saccade or a sudden movement of the image camera, movement of parts of the visual signal, appearance or disappearance of an object in the visual scene), or alternatively a clock signal may be used as the temporal reference.

Each of the frames 121-125 in FIG. 1A contains a representation of an object (an upright cup 161 and rotated cups 162-165) that is undergoing a rotational transformation. Other transformations, such as translation, scaling, lighting, transparency, color changes, and/or a combination thereof are equally compatible with the invention, provided the transformations occur slowly, compared to the frame rate, and sequential phases (views) of the object transformation appear in a temporal proximity in the captured frames, as illustrated in the frames 121-125 of FIG. 1A.

The term "temporal proximity" is used in the present context to describe object representations (views) that appear within a sequence of input frames taken over a period of time commensurate with the object transformation time scale. The exact duration of this interval may be application-specific. For example, in an embodiment of the object recognition apparatus configured to process visual signals containing one or more people, it is useful if object transformation lasts for about 2-7 frames (or for a period of 100-300 ms) in order for the detection apparatus to capture sufficient information related to the object. It will be appreciated by those skilled in the art that the above parameters are exemplary, and other applications (e.g., radar images of air/space craft or projectiles, tomographic images of human body and organs, visual and radio-frequency images of celestial objects, sonar images of underwater vehicles, etc.) each impose different requirements and/or bounds on the timing of object transformation persistence.

In the embodiment of FIG. 1A, the image-to-pulse encoding is configured to produce different patterns of pulses in response to different representation of the same object, as illustrated by the pulse groups corresponding to objects representations 161-165 in the frames 121-125. Even relatively similar object representations, such as cups 164, 165 of close orientation, are encoded into two very different pulse patterns, as illustrated by the pulse groups 147, 148 in FIG. 1A. Herein lies one salient advantage of the invention; i.e., the ability to discriminate minute distinctions between two images.

In another embodiment (not shown), two different objects (or the same object with different parameters) are encoded into the same pattern of pulses, in which case internal representation invariance is then a property of the encoder. Therefore, a detector that receives such patterns inherits that particular invariance. For example, contrast and/or color information can be lost in the encoding stage, in which case the object detection apparatus responds invariantly to frames of different contrast and/or color.

Returning to FIG. 1A, a detector (for example, the detector 110_1 of FIG. 1) receives the pulse group (such as 145-148), and generates a detection signal (pulses 151-156) in response to every pulse group that contains the predetermined pattern of pulses corresponding to the object of interest.

As the detector receives the input pulses, it makes a determination whether or not to "fire" a detection signal. In one implementation the detector is likely to fire when input pulses arrive fairly synchronously along some subset of input channels. In another implementation the detector is likely to fire if the incoming pattern of pulses exhibits certain inter pulse intervals. In one implementation, the detector logic relies on a continuous nature of the natural world, wherein pulse patterns that are similar and arrive in proximity are very likely to encode the same object. The detector logic adjusts the likelihood of detection signal based on input/detection history. This is an exemplary adjustment mechanism of the detection apparatus that increases a likelihood of the detector response to that particular object. The detection signals are transmitted from the detector node to downstream nodes along respective downstream transmission channels (such as the channel 135 in FIG. 1A).

Such appearance of consecutive sequence of views in temporal proximity facilitates object identification by the apparatus invariantly to the object transformation. Specifically, the detection apparatus of FIG. 1A recognizes the rotated cup in each of the frames 162-165 as being the same object of interest as in the frame 161, even though the views of the object, and consequently the representations thereof, are different. As it will be appreciated by those skilled in the art that while the exemplary embodiment of FIG. 1A shows different or distinct views of the object transformation within the input frame sequence 161-165, other frame sequence configurations are compatible with the invention (for example, repetitions of the same view for more than one frame, etc.). Such repeated frames none the less allow the detection apparatus to recognize the object invariantly to the transformation, while (in one implementation) increasing the processing time required for detection.

In the embodiment of FIG. 1A, the first frame 121 comprises a default representation of the object (the upright cup 161) that corresponds to the target state of the detector, described in detail below with reference to FIGS. 2A-2C. The detector is configured to recognize the pulse pattern corresponding to that default representation, and to generate the detection signal (a positive response).

In another implementation (not shown), the exemplary apparatus of FIG. 1A may not necessarily produce the detection signal when a new object (or objects) first appears in the input signal. If the first input pattern of pulses corresponds to the target state (for example the upright cup), the detector generates the detection signal. When, however, the detector receives an input pulse pattern corresponding to a different object representation (such as an upside down cup), it may not recognize it based on the pulse group of one such frame alone. However, receipt of subsequent pulse groups corresponding to the upside down cup (over many frames) by the detector causes the detector to recognize the upside down object representation (even in representations that were previously not recognized) due to the temporal proximity-based adjustment mechanism described below in further detail.

Once the object representation is identified (recognized) by the detector (via matching the corresponding pulse pattern), or the detector collects additional information indicating that the input represents an object of interest, the sensitivity of the detector is in one embodiment adjusted (increased), so that the detector node becomes more sensitive to that specific object representation, and is more likely to recognize that specific object in the subsequent pulse groups.

In one implementation, the detector is configured to generate detection signal only after receiving the whole input pulse group, as illustrated by the detection signals 153 corresponding to the pulse group 146.

In another implementation, the detector is configured to respond to an input pattern even before all of the input pulses arrive at the detector, as illustrated by the detection signal 152 corresponding to the pulse group 145 in FIG. 1A. In this implementation, the detection signal 152 is generated before the last pulse of the pulse group has arrived at the detector (such as pulse 143 of pulse group 145 propagating on the channel 134). Under this approach, the leading portion (also referred to as the "prefix") of the pulse group 145 is sufficient to trigger the detection logic of the detector such that subsequent pulses are not necessary to perform recognition. It also enables the detection apparatus to report object detection sooner. In one configuration, the remaining input pulses may be used to trigger additional detection pulses, and contribute to detector excitability adjustment.

In another approach, the encoder is configured to generate more than one pulse for one or more selected transmission channels, as illustrated by the pulses 144 transmitted on the channel 132, corresponding to the input frame 125 in FIG. 1A.

In another variant, the detection signal generated by the receiving unit contains more than one pulse, corresponding to the same input pulse group, as illustrated by pulses 155, 156 corresponding to the same pulse group 148 and frame 125 in FIG. 1A. In this approach, multiple pulses sent over a particular channel within the same pulse group serve to emphasize the importance of that particular channel for object detection, and to facilitate detection response from the receiving unit. In another variant, transmissions of multiple pulses are used to combat effects of noise, interference and/or intermittent connections during transmission.

In yet another embodiment of the invention, the timing of the detection signal (i.e., detection pulse latency) with respect to the arrival of the first input pulse at the detector encodes the level of confidence generated by the detection algorithm that the input pulse group represents the object of interest. In one variant, a delayed response (long latency) corresponds to a low confidence of the detection algorithm. Such delay may be caused by, for instance, performing additional computations (e.g., additional iterations of the algorithm, etc.) by the detector. A timely detector response (short latency) conversely corresponds to a higher confidence of the detector.

In one implementation, such delayed detection signal is followed by a lower latency ('fast') detection signal that corresponds to a subsequent pulse group that is a better match (closer to the actual target state). In effect, a late-generated detection signal facilitates the detector response to the next frame, and causes a downstream detector to receive two input pulses.

In still another embodiment, object encoding apparatus and methods useful with the present invention are described in a commonly owned and co-pending U.S. patent application Ser. No. 13/152,084 entitled APPARATUS AND METHODS FOR PULSE-CODE INVARIANT OBJECT RECOGNITION incorporated by reference, supra, is used. This approach encodes an object into a group of pulses such that an identity (or type) of each object is encoded into relative (to one another) pulse latencies and parameters of the object, such as scale, position, rotation, are encoded into the group delay (that is common to all pulses within the group) of the pulse group. This encoding approach enables object recognition that is invariant to object parameters, such as scale, position, rotation, hence advantageously simplifying the object detection apparatus.

Invariant Recognition Via Adjustment of Detector Excitability

In another aspect of the invention, the object recognition apparatus (such as the apparatus 100 of FIG. 1A) is configured to dynamically adjust dynamic properties of the detectors, such as excitability (also referred to as the excitability parameter, node sensitivity or node responsiveness), as a result of performing detection computations and or pulsed input to the detector.

In the art, the term "excitability" is typically used to describe the propensity of neurons to excite (or fire) an action potential in response to stimulation. Similarly, the term increased excitability is used herein, without limitation, to describe increased sensitivity of the detector node to a particular input pattern of pulses. This increase results in a detection enhancement regime and is achieved in a variety of ways including, but not limited to, lowering detection threshold (e.g., a correlation score) or amplifying the input, releasing detector from inhibition, or a combination thereof.

In one approach of the invention, shown and described with respect to FIGS. 2A-2C below, dynamic behavior of the detector apparatus is described by the following detector state equation:

$$\frac{d\vec{v}}{dt} = F(\vec{v}) + I(t), \quad \text{(Eqn. 1)}$$

where $\vec{v}$ is the detector state vector; $F(\vec{v})$ is the vector state function of $\vec{v} \in V$, V being the set of all possible states of the system, and I(t) is an input into the detector (such as pulse groups 145-148 in FIG. 1A). The detector response is determined based on the condition that $\vec{v} \in S$ for some set $S \subset V$. Here the set S corresponds to the detector target state, also referred to as the pulse regime set, where the detector is configured to generate the detection signal. When the object is detected (and the detection signal is generated) by the detector, the detector state is reset according to the following equation:

$$\vec{v} := G(\vec{v}) \quad \text{(Eqn. 2)}$$

where $G(\vec{v})$ is a predetermined reset function. The increase in detector sensitivity to subsequent inputs is achieved by introducing a state adjustment variable $\vec{e}$, which describes the state vector adjustment such that for all $\vec{v}$ the following condition is satisfied:

$$\|\vec{v} + \vec{e}, S\| < \|\vec{v}, S\|, \quad \text{(Eqn. 3)}$$

where $\|, S\|$ denotes distance to set S. In one approach the distance $\|, S\|$ is a Euclidean norm.

The state adjustment parameter is chosen such that it converges to zero with time to reflect the fact that temporally close inputs are likely to represent the same object. In one variant, the convergence is exponential and is expressed as:

$$\frac{d\vec{e}}{dt} = -\frac{\vec{e}}{\tau}, \quad \text{(Eqn. 4)}$$

Using Eqn. 4, the vector state Eqn. 2 becomes:

$$\frac{d\vec{v}}{dt} = F(\vec{v}) + \vec{e} + I(t) \quad \text{(Eqn. 5)}$$

When the detector recognizes the predetermined pattern of pulses (corresponding to the object of interest) and generates the detection signal, the detector state arrives at the target set S. The detector state adjustment vector is therefore reset as $\vec{e} := \vec{e}_{reset} \neq 0$. The non-zero state adjustment parameter $\vec{e}$ is configured to push the state vector towards the set S (make the set S 'more attractive'). When $\vec{e}$ is substantially greater than zero, a weaker input is sufficient for the detector to reach the state S and to generate the detection response. Furthermore, state adjustment in response to the detection sets the state adjustment parameter to a non-zero value, which in turn increases a likelihood of subsequent responses.

The generalized form of Eqn. 5, rewritten for two state variables $\vec{v}=(v_1, v_2)$, $\vec{e}=(e_1,0)$, $I(t)=(I_1(t), 0)$, is then:

$$\frac{dv_1}{dt} = F_1(v_1, v_2) + e_1 + I_1(t) \qquad \text{(Eqn. 6)}$$

$$\frac{dv_2}{dt} = F_2(v_1, v_2),$$

where $F_1$ and $F_2$ are state functions governing dynamics of the state variables $v_1$ and $v_2$, respectively.

Figure 2A:
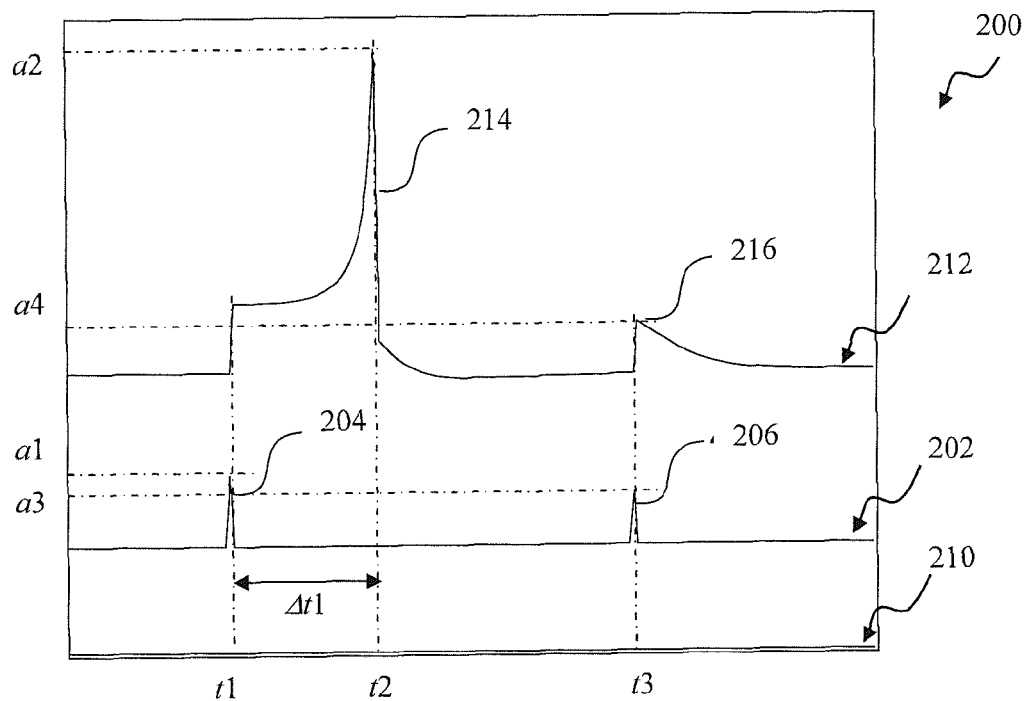
FIG. 2A is a graphical illustration of detector node operation in response to an input according to one embodiment the invention.

FIG. 2A illustrates one exemplary approach of detector operation, where excitability (sensitivity) of the detector is kept constant, and is governed by the following implementation of the state Eqn. 6:

$$\frac{dv_1}{dt} = av_1^2 + bv_1 + c - dv_2 + e_1 + I_1(t) \qquad \text{(Eqn. 7)}$$

$$\frac{dv_2}{dt} = pv_1 + q - rv_2,$$

where parameters of the Eqn. 7 are set as follows:

$$a=0.007, b=0.7, c=16.8, d=-0.007, p=-0.06, q=-3.6,$$
$$r=-0.03. \qquad \text{(Eqn. 8)}$$

The state conditions are as follows: (i) the pulse condition is attained when $v_1 > 30$; and (ii) the reset conditions are:

$$v_1 := -50,$$

$$v_2 := v_2 + 100. \qquad \text{(Eqn. 9)}$$

FIG. 2A depicts detector response governed by Eqns. 7-9 in accordance with one embodiment of the invention. In FIG. 2A, the trace 212 depicts the system state variable $v_1$, the trace 202 depicts input I(t), and the trace 210 denotes the state adjustment variable $e_1$. The horizontal axis shows time progression. At time t1, the detection apparatus 200 receives an input pulse 204 of an amplitude a1, corresponding to one of the pulses of the pulse group generated by the encoder (and transmitted along one of the transmission channels, as described above with respect to FIGS. 1 and 1A). Note that although the apparatus 200 is configured to receive pulses within the pulse group on different channels, only a single input channel is shown for clarity in FIG. 2A. If the detector logic determines that the pulse 204 (in conjunction with other pulses) forms the predetermined pattern, the detector subsequently generates the detection signal 214 (the output pulse) of amplitude a2 at time t2=t1+Δt1.

At time t3>=t2, another input pulse 206 of amplitude a3<a1 is received by the detector 200. The weaker input 206 does not evoke a detection signal output from the detector. In one variant, lack of the detector output is due the detector object recognition logic producing an output that is outside the detection boundary (for example, below a detection threshold). In another variant, the detection logic is configured to screen out input pulses with amplitudes that are below a predetermined level. At time t3, the detector of FIG. 2A produces a weak transient deviation 216 from the rest state with amplitude a4 that is much lower than the amplitude of the detection signal 214. In another approach (not shown), the detector output channel stays quiet under this same condition. The detection apparatus 200 has the state adjustment variable $e_1$ set to zero, as depicted by the trace 210 which remains at the base state throughout the FIG. 2A.

Figure 2B:
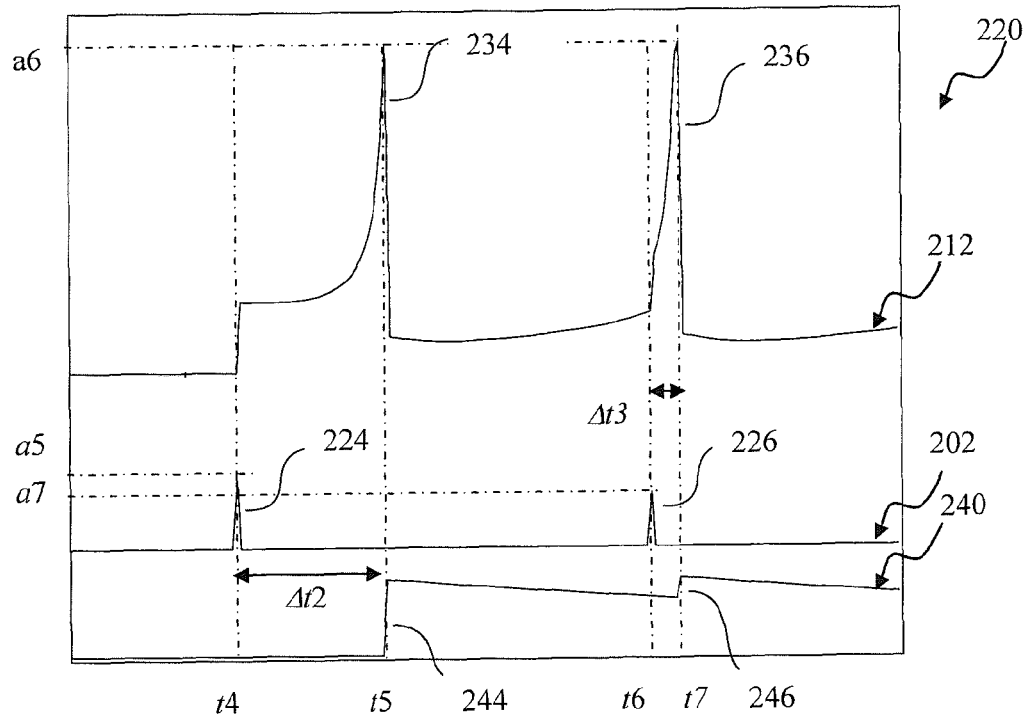
FIG. 2B is a graphical illustration of detector sensitivity adjustment in response to a detection signal generation according to one embodiment the invention.

Contrary to the approach described with respect to FIG. 2A supra, FIG. 2B depicts the dynamics of the detector apparatus when configured to adjust the detector state every time the detector produces a detection output. The state adjustment is performed by setting the state adjustment variable $e_1$ as follows:

$$e_1 := 106. \qquad \text{(Eqn. 10)}$$

In order to exploit the temporal structure of the input, the adjustment variable e1 is configured to decay exponentially with time according to the following expression:

$$\frac{de_1}{dt} = -\frac{e_1}{\tau}, \tau = 220. \qquad \text{(Eqn. 11)}$$

A typical operational scenario for the detector embodiment shown in FIG. 2B is as follows: at time t4 the detector 220 receives an input pulse 224 of amplitude a5 and generates a detection signal 234 of amplitude a6 at time t5. At time t5=t4+Δt2, the detector state is further adjusted (step 244) by setting the state adjustment variable in accordance with Eqn. 10. The state adjustment parameter $e_1$ decays with time in accordance with Eqn. 11, as depicted by a diminishing amplitude of the trace 240 in FIG. 2B.

At time t6, the detector 220 receives a weaker input 226 of amplitude a7<a5. Contrary to the detector 200, the weaker input 226 evokes a detection output pulse 236 of amplitude a6 at time t7. The difference in the outcomes between the two detector embodiments of FIGS. 2A and 2B is due to, inter cilia, the state adjustment variable being substantially greater than zero in the detector embodiment of FIG. 2B, when the second, weaker, input arrives at the detector at time t6.

At time t7=t6+Δt3 (when the second detection 236 signal is generated), the state adjustment variable $e_1$ is reset again to the predetermined level (step 246 in FIG. 2), thereby sustaining the increased sensitivity of the detector to subsequent inputs. The detection apparatus corresponding to FIG. 2B is referred to as the learning detector. That is, a prior input ("a history") effects a change in the dynamic behavior of the detection apparatus, therefore, casing the apparatus to respond differently to subsequent input pulses. The detection apparatus 220 is configured to adjust its dynamic state (244, 246) every time the detection signal (234, 236) is generated. This behavior is substantially different from the detector behavior shown in FIG. 2A above, where the detector dynamic state is not affected by prior inputs.

Figure 2C:
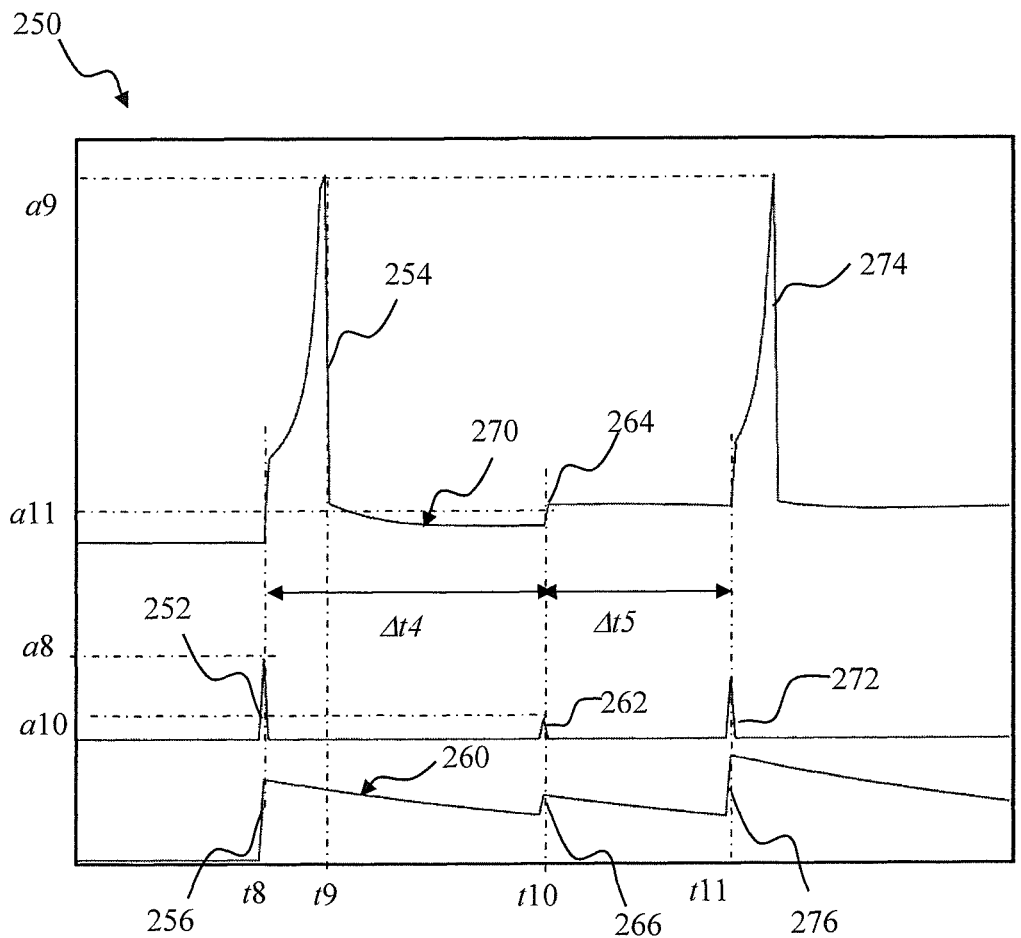
FIG. 2C is a graphical illustration of detector sensitivity adjustment in response to an input according to one embodiment the invention.

Another approach to detector state adjustment is shown and described with respect to FIG. 2C. The detector apparatus of FIG. 2C is configured to adjust its dynamics for every input pulse it receives, without regard for the detection signal generation. An exemplary operation sequence of FIG. 2C detector embodiment is as follows: at time t8 the detector receives an input pulse 252 of an amplitude a8 and generates a detection signal 254 at time t9. Subsequent to the detection signal generation, the detector output decays with time, as shown by the trace 270. Contrary to the embodiment of FIG. 2B, detector state in FIG. 2C is adjusted at time t8 (step 256), for example, in accordance with Eqn. 10. The state adjustment variable $e_1$ 260 decays exponentially with time, for example, in accordance with Eqn. 11. However, the time decay constant τ in the detector embodiment of FIG. 2C is greater than that of the embodiment of FIG. 2B, as seen from comparing the traces 260 and 240, respectively.

At time t10, the detector 250 receives a weaker input 262 of amplitude a10<a8. Similarly to the embodiment of FIG. 2A, the weaker input pulse 262 does not evoke the detection signal, but results in the detector 250 producing a weak transient deviation 264 from the rest state with an amplitude all that is much lower than the amplitude a9 of the detection signal 254. In another embodiment (not shown), the detector output channel stays quiet. At time t10 the state adjustment variable $e_1$ is reset (step 266 in FIG. 2), thereby increased excitability (sensitivity) of the detector to subsequent inputs.

Although the detection apparatus 250 employs the state adjustment (such as 256, 266) in response to an input (252, 262), the detector response differs from that of the detector 220 described above. While the state of the detection apparatus 250 is adjusted for every received input, the detection signal is not generated in response to every input pulse (such as the input 262). This is due to a faster decay of the state adjustment variable $e_1$ in the detector 250 compared to the detector 220, as is seen by comparing the traces 240, 260 of FIGS. 2B and 2C, respectively. As a result, the state of the detector of 250 progresses further away from the target set (firing set) S between the time t8 (when the state is adjusted) and the time t10 (when the subsequent input pulse 262 arrives). Detector state that is further distance away from the target set (as indicated by a lower level of trace 260 at time t10, compared to the level of trace 240 at time t6) prevents the detector 250 from generating the detection signal in response to the input pulse 262.

However, the state adjustment 266 causes the detector to respond differently to a subsequent input pulse 272 that arrives at the detection apparatus 250 at time t11 and triggers generation of the detection signal 274. The difference in the detection apparatus 250 responses to input pulses 262, 272 is due to, inter alfa, a shorter time lag Δt5 between the pulses 272 and 262, compared to the time lag Δt4 between the input 262 and 252. As a result, the state of the detector 250 at time t11 is closer to the target set S, as illustrated by a higher level of the parameter $e_1$ (trace 260 in FIG. 2C) at time t11.

Figure 2D:
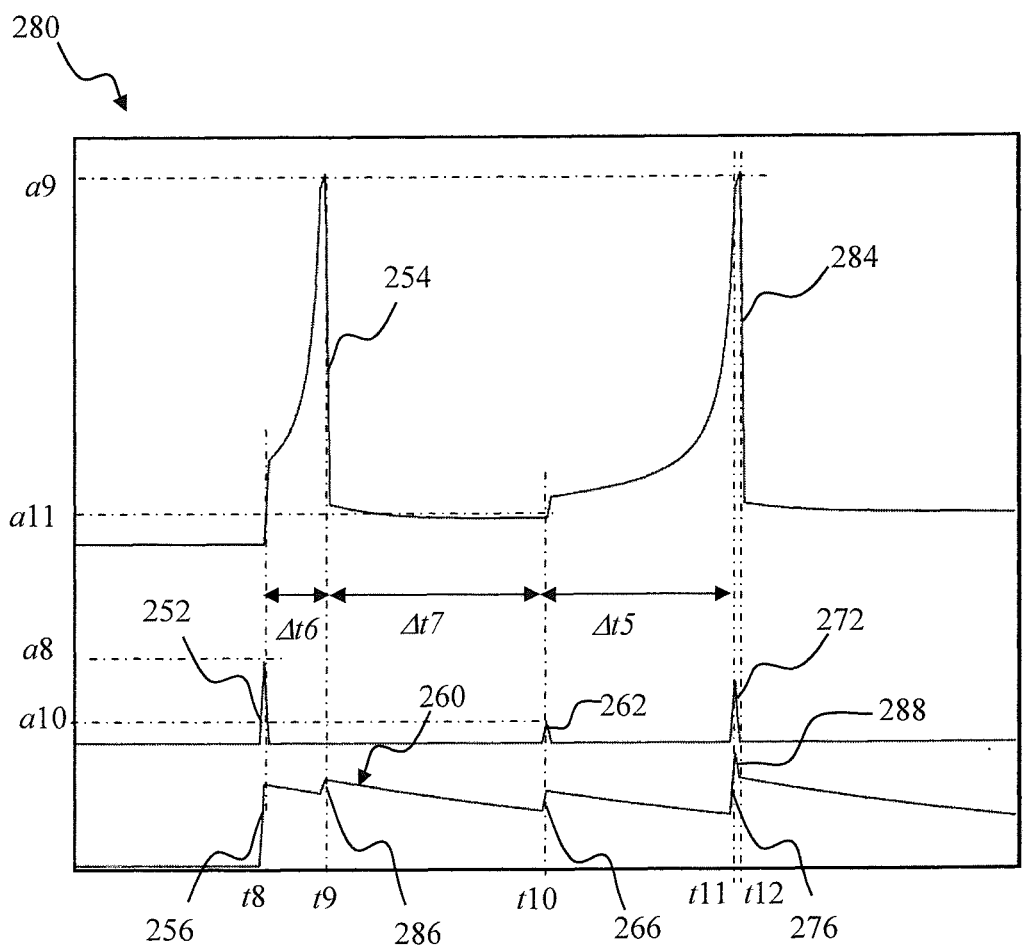
FIG. 2D is a graphical illustration of detector sensitivity adjustment in response to both an input and a detection signal generation according to one embodiment the invention.

In another implementation, the detector state is adjusted in response to both input arrival and detection signal generation, as is shown and described below with respect to FIG. 2D. An exemplary operation sequence of the detector 280 embodiment is as follows: at time t8 the detector receives an input pulse 252 of an amplitude a8 and generates a detection signal 254 at time t9=t8+Δt6. In contrast to the embodiments of FIGS. 2B-2C, detector state in FIG. 2D is adjusted responsive to both, the input pulse at time t8 (step 256) and the detection pulse at t9 (step 286), for example, in accordance with Eqn. 10. As before, the state adjustment variable $e_1$ 260 decays exponentially with time, for example, in accordance with Eqn. 11.

Similarly to the embodiment of FIG. 2C, the weaker input pulse 262 of amplitude a10<a8 does not evoke the detection signal, but results in the detector state adjustment 266 at time t10, and therefore an increased sensitivity of the detector 280 to subsequent inputs.

Multiple detector state adjustments 256, 286, 266 move the detector 280 state closer to the target set S, thereby causing the detector to respond more quickly to a subsequent input pulse 272 that arrives at time t11 and triggers generation of the detection signal 284 at t12. As before, the detector state is adjusted at times t11, t12 (step 276, 288 in FIG. 2D), thereby increased excitability (sensitivity) of the detector to subsequent inputs.

In another variant (not shown), the state adjustment is implemented by setting the state adjustment variable to the input I(t) as: $\vec{e} := \vec{e} \times + I(t)$. In this case the adjustment variable is a running, decaying average of the input activity.

The detector implementations described with respect to FIGS. 2B-2D are in one embodiment obtained by a detector state model developed by the Assignee hereof, which cause the detection apparatus to adjust its response based on a history of pulsed inputs so that a prior input effects a change in the dynamic behavior of the detector (i.e., by increasing detector excitability and causing the detection apparatus to respond differently to subsequent input pulses). In one variant of the invention, the timescales $t_{det}$ (over which the detector excitability adjustment persists) are typically on the order of several frames (2-7), and are configured to effect object detection within a sequence of temporally proximate views of the object during a transformation (see description of FIG. 1A, supra).

Invariant Recognition Via Channel Adjustment

In another aspect of the invention, invariant object detection is facilitated via an adjustment of transmission channels, such as the communication channels 108, 112 in FIG. 1. Similarly to the detection apparatus of FIGS. 2B-2D described supra, the detection apparatus of this approach is configured to adjust transmission channel properties in response to a channel pulse transmission history and/or detector activity history. These adjustments change future susceptibility of the detection apparatus thus causing it to respond differently to subsequent pulse inputs. The term "susceptibility" is used here to refer generally and without limitation to a combined effect of channel adjustment and detector node adjustment, and is differentiated from the term "excitability" (the latter which only applies to the detector node adjustment).

In one approach to susceptibility adjustment of the invention, the detection apparatus combines a quadratic integrate-and-fire detector model of Eqn. 7 with a simulated transmission channel as follows:

$$\frac{dv_1}{dt} = av_1^2 + bv_1 + c + I_1(t) + f(g, v), \quad \text{(Eqn. 12)}$$

where g(t) is the channel gain, and $f(g, v)$ is the channel response function. In one approach, the transmission channel is modeled as the N-Methyl-D-aspartate (NMDA) channel where $f(g_{NMDA})$ is a function of channel parameter $g_{NMDA}$:

$$f(g_{NMDA}, v) = -\frac{\alpha v g_{NMDA}}{1 + e^{(v_1 - v)/2}} \quad \text{(Eqn. 13)}$$

and $$\frac{dg_{NMDA}}{dt} = -\frac{g_{NMDA}}{\tau_{NMDA}}. \quad \text{(Eqn. 14)}$$

In Eqns. 12-14 parameters a,b,c,$v_1$, α, and $\tau_{NMDA}$ are configured to achieve desired model behavior. In one variant, the channel parameter corresponds to a channel gain and is adjusted anytime I(t)≠0 as follows:

$$g_{NMDA} = g_{NMDA} + I(t). \quad \text{(Eqn. 15)}$$

The exemplary NMDA channel works as follows. When detector state v is near the rest and $g_{NMDA}$ is positive, the state v is weakly pushed towards the target state. The input pulses arriving to the detector node (detector banks 110, 114 of FIG. 1) cause channel gain adjustment by incrementing the $g_{NMDA}$ by the value of the input signal at this time. In this approach, stronger input pulses (pulses of higher amplitude) produce larger adjustment, and hence make the detector apparatus more sensitive to subsequent inputs. The adjustment logic may be implemented separately in each channel if desired. Such channels are referred to as the "smart channels". Alternatively, the adjustment logic for all of the channels is implemented in the detector node, therefore allowing for simpler channel architecture. Combinations of the foregoing may also be employed.

In one variant, the detector node uses a linear superposition of channel contributions $g^{ch}_{NMDA}$ in order to generate detection signal. Linear superposition of all channels is determined as:

$$g_{NMDA} = \Sigma_{ch} g^{ch}_{NMDA}, \qquad \text{(Eqn. 16)}$$

where $g_{NMDA}$ is equivalent to a single channel gain parameter of Eqn. 12. That is, for a linear channel superposition, an adjustment of the detector gain is equivalent to a gain adjustment of all respective channels, provided that the condition of the Eqn. 16 holds. In one approach, this equivalence advantageously simplifies implementation of the detector apparatus by implementing gain adjustment $g_{NMDA}$ in the detector node itself and allowing for a simpler channel configuration. The functionality obtained is exactly the same as above, but the increased susceptibility to subsequent input is now the property of the pulse-carrying channel. Other channel superposition implementations and/or channel scaling are usable with the exemplary embodiment of the present invention, provided that the condition of Eqn. 16 is satisfied.

In another variant, the detector apparatus description of Eqn. 14 is extended to multiple channels that are coupled to the same detector. In this approach, each of the transmission channels is characterized by its own unique parameter $g^{ch}_{NMDA}$ as:

$$\frac{dg^{ch}_{NMDA}}{dt} = -\frac{g^{ch}_{NMDA}}{\tau_{NMDA}} \qquad \text{(Eqn. 17)}$$

The channel gain is set to a value (predetermined or dynamically derived), which may be unique to that particular channel or shared among many channels.

In another approach of the invention, a transmission delay of the channel is adjusted as required (either up or down) in response to the channel carrying an input to the detector. In yet another variation, the channel parameter (gain or delay) is adjusted for every channel that is coupled to the detector, after that detector has generated a detection signal based on a pulse group, even if that particular channel did not carry an input pulse for that group.

In one embodiment, the detection apparatus adjusts channel parameters in response to a detector receiving an input pulse via the channel. Such functionality provides for increasing the likelihood of detecting an object of interest based on prior inputs, even when these inputs had not evoked a prior detection response from the detector.

In one implementation, channel adjustment persists over only a set of several frames (e.g., 2-7). Therefore, the channel adjustment timescales $t_{gch}$ are comparable to the detector excitability adjustment timescale $t_{det}$ shown and described with respect to FIGS. 2B-2C. Channel gain adjustment is also configured to effect object detection within a sequence of temporally proximate views of the object during a transformation (see description of FIG. 1A, supra).

Invariant Object Recognition with Slow Channel Modulation

In another aspect of the invention, channel characteristics (such as gain or transmission delay) are modulated so that the channel contribution to the detector varies with time. In one implementation, channel modulation is configured to suppress some of the channels, such as by setting channel gain to zero or transmission delay to a value outside of the limits that are allowable by the detection logic. Channel modulation advantageously provides a mechanism allowing the detection apparatus to search for a most optimal channel configuration to account for varying inputs and changes of the detector node configuration (detector network topology).

In one approach, channel modulation is implemented on time scales $t_{mod}$ that are relatively long, compared to the inter-frame interval. The channel modulation allows the detection apparatus to select transmission channels that are the most relevant (i.e., provide the largest contribution) to the detection computations. The channels that are relevant to a particular detector are those that are active (carry a pulse within the pulse group) whenever the detector recognizes an object of interest (and thus responds with a detection signal). In addition, due to increased excitability obtained by any of the mechanisms described supra, the detector is also likely to respond to subsequent inputs that following the triggering pulse group and thus channels involved in carrying pulses of the subsequent pulse groups become relevant. If the input has temporal consistency, certain sequences of input appear together frequently. The transmission channels that are inconsistent with the representations of the object of interest; that is, their pulses do not correlate with the activity of the receiving unit may be turned down and eventually ignored.

In another approach of the invention, channel modulation is effected via (i) probabilistic methods, or (ii) a combination of deterministic and probabilistic techniques, where one portion of the channels is modulated deterministically, and other channels are modulated using statistical analysis. In another variant, the deterministic/probabilistic channel modulation is performed with respect to time, such that during one period of time (e.g., search for most optimal channel) channels are modulated using random variables approach. Once the optimum channel (or a group of channel) is detected, these channel(s) are modulated deterministically.

In one embodiment, the pulse timing-dependent plasticity is used as the long-term modulation to potentiate (amplify) or suppress certain transmission channels. Every time the detector (such as the detector 135 in FIG. 1A) generates the detection signal 154 that is based on the pulse group 147, all of transmission channels (131-133) that deliver pulses to the detector 135 within a predetermined time window prior to the detection signal generation) are amplified according to the following relationship:

$$df_c = f(t - t_c) \qquad \text{(Eqn. 17)}$$

where $t_c$ is the arrival of the last input pulse to the detector on channel c and $f(t)$ is a predetermined the detector gain function. In one variant, an exponentially decaying function form is selected:

$$f(t) = \alpha e^{-t}. \qquad \text{(Eqn. 18)}$$

In another variant, every time the transmission channel delivers an input pulse to the detector (as a part of the pulse group 147 in FIG. 1A), the channel transmission strength is depressed by the amount:

$$dg_c = g(t - t_f), \qquad \text{(Eqn. 19)}$$

where $t_f$ is the time of the last output pulse from the detector and $g(t)$ is a gain function. In order to implement a bounded detection system, the transmission channel gain is maintained within a predetermined range, typically between zero and a maximum allowable value, that is configured based on a specific implementation.

Figure 2E:
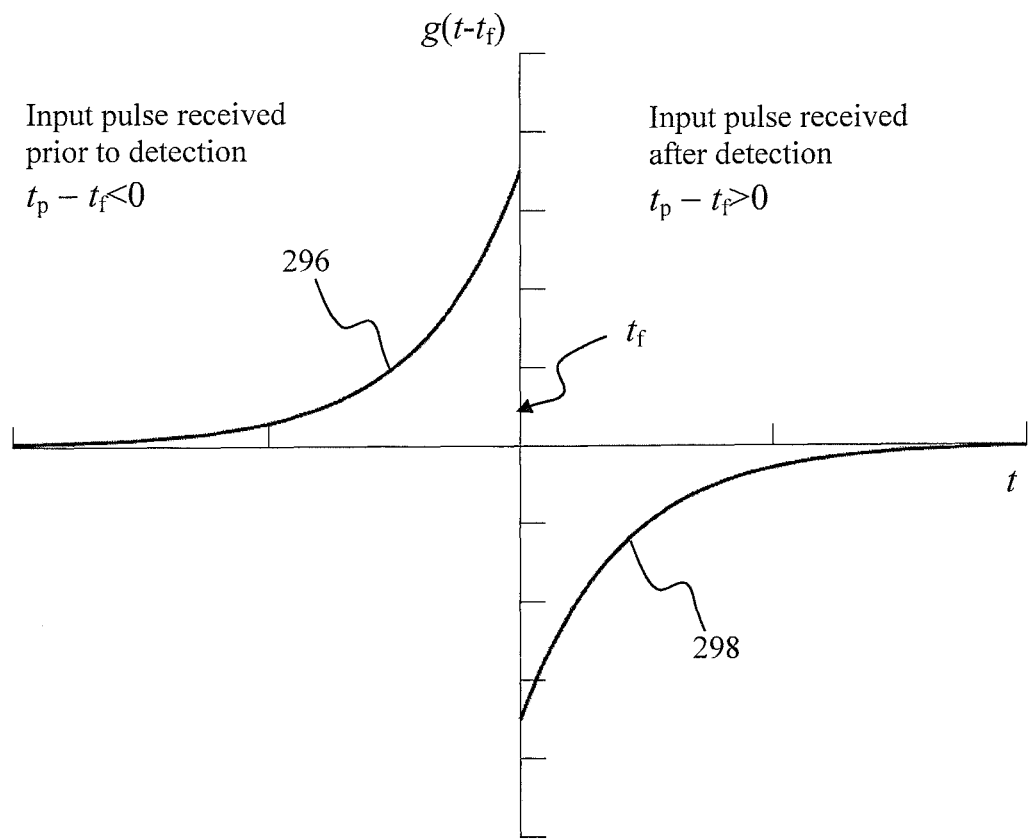
FIG. 2E is a graphical illustration of channel gain modulation in response to an input according to one embodiment the invention.

FIG. 2E depicts an exemplary channel modulating function. The magnitude of the exemplary gain adjustment of FIG. 2E is configured with respect to the time interval between the received pulse $t_p$ and the detection pulse $t_f$ (such as the detection pulse 154 FIG. 1A) generated in response to the pulse group (for example, the pulse group 147 FIG. 1A). When the pulse arrives to the detector before the detection signal (branch 296) the respective channel is amplified, with the most recent contributions (smaller $|t_p-t_f|$) being amplified the most. In one variant, even the channels that transmit pulses that correspond to pulse groups prior to the detection signal are amplified, but the amount of extra gain is greatly reduced due to a fast decaying characteristic of the gain function (such as for example of Eqn. 18), thus making these older channel pulses less relevant. When the pulse arrives to the detector after the detection signal (branch 298 in FIG. 2E) the respective channel is suppressed, with the most recent contributions (smaller $|t_p-t_f|$) being suppressed the most.

In one variant, the channel gain function g(t) is selected in the same form as the detector gain function f(t). The parameters of Eqns. 17 and 19 are e.g., selected to such that the transmission channel gain is modulated within a bounded range that is specific to a particular application. This approach enables the detecting apparatus to amplify the transmission channels that frequently carry input pulses (within the predetermined time window) prior to the detection pulse, and suppress the other channels that deliver pulses inconsistent with the temporally proximate views of the object (see description of FIG. 1A supra).

In another variant, the pulse timing-dependent plasticity, as described above, provides for a selection of the smallest set of channels that are required for detection of each specific object. A detector, responding with detection pulses to a particular group of pulses that arrive over a set of channels, causes amplification of these channels and reduction of other channels using pulse timing-dependent plasticity (for example of FIG. 2D). Over time, only the channels that contribute to that particular pulse group sequence remain active. However, as the plasticity of the detector apparatus continues to amplify active channels, the detector generates detection pulses before all of the pulses (within the pulse group) arrive at the detector (see description with respect to FIG. 1A above). As a result, the pulse timing plasticity in effect selects a subset of channels that carry a prefix of the group of pulses that the detector reports, thus advantageously resulting in the smallest possible channel subset, allowing for faster detection.

In another approach, pulse timing dependent plasticity is used in combination with a recovery mechanism which amplifies suppressed channels over a longer time scale. This approach advantageously provides a recovery a mechanism that prevents detector input starvation: i.e., where all of the inputs to a particular detector (such as the detector 135 in FIG. 1A) are suppressed (inactive) due to an adverse combination of different factors (such as input, channel noise, detector and channel gain, detector inhibition, etc). The recovery mechanism enables amplification of (at least a portion of) the transmission channels over a certain period of time $t_{rec}$ so that the detector becomes active.

In another embodiment of the invention, the detection apparatus achieves increased susceptibility to certain inputs by modulating the strength of pulse timing-dependent plasticity dependent on the detector activity history. In one variant, the potentiation of a transmission channel in response to a detection pulse (for example, the detection pulse 154 in FIG. 1A) is increased if the detector has been previously active (such as the detector generated one or more detection pulses during a predetermined time window prior to the detection pulse 154). In another variant, channel suppression is reduced following pulse delivery to a recently active detector.

In one approach of the invention, channel modulation timescales $t_{mod}$ are configured to be at least an order of magnitude longer, as compared to the channel gain adjustment $t_{gch}$ and detector excitability adjustment $t_{det}$ timescales described above. In one implementation, the slow channel modulation is configured to depend on the overall activity of the detector apparatus, and is effective over thousands of frames.

Invariant Recognition of Multiple Objects by Mutual Inhibition

In another aspect of the invention, one or more detector nodes are configurable to affect activity of other nodes by providing a signal (or signals). These signals may promote or inhibit secondary node activity and control the degree of inhibition, resulting in a competition between nodes. Such competition advantageously facilitates the detection apparatus recognizing multiple objects invariantly with respect to temporally consistent transformations of these objects. In turn, in one approach, multiple nodes are configured to mutually inhibit each other.

For the purposes of this discussion, the terms 'inhibition', 'inhibition regime", or "inhibited state" are used without limitation to describe a reduced likelihood of the detector generating a detection signal responsive to a pulse group, or a detection signal degeneration that is delayed, compared to an uninhibited state. In one embodiment of the invention, an inhibited detector still is allowed to generate detection signals (provided it receives a sufficiently favorable input).

Figure 3:
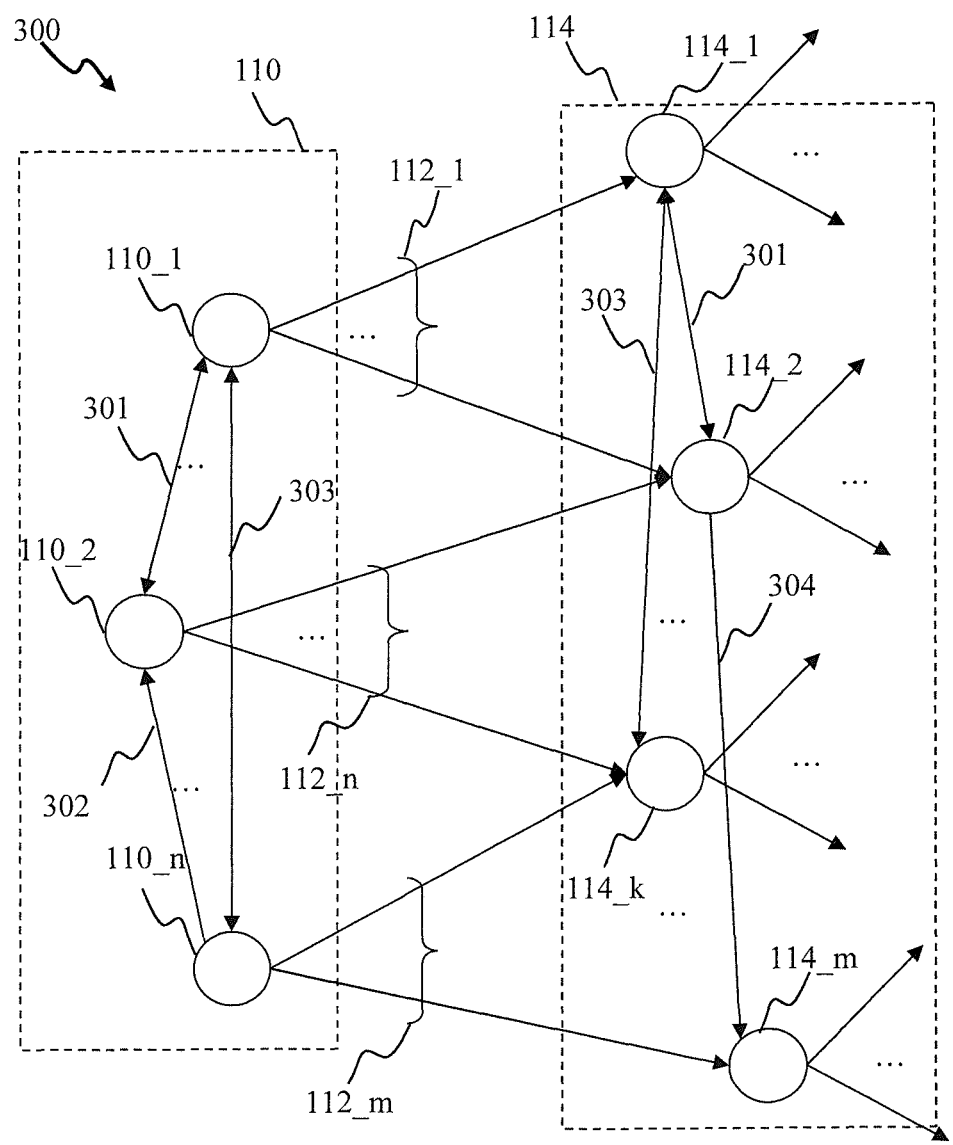
FIG. 3 is a block diagram illustrating one embodiment of the invention where the object detection apparatus is equipped with detector inhibition.

FIG. 3 is a block diagram of an exemplary detector network apparatus configured for invariant object recognition using detector inhibition according to one embodiment of the invention. The apparatus 300 comprises several banks of detectors 110, 114, that are similar to the detectors described above with respect to FIG. 1. In the embodiment of FIG. 3, different detectors of the same bank are denoted by a "_n" designator, such that for example designator 110_1 denotes the first detector of the detector bank 110. Although only a few detector nodes are shown in each bank of the embodiment of FIG. 3 for clarity, it is appreciated any practical number of detector nodes that is compatible with the detection apparatus hardware and software limitations is compatible and useful with the present invention.

Similar to the apparatus 100, the detectors of the detector bank 110 are coupled to an encoder (for example, the encoder 104 of FIG. 1) via a plurality of transmission channels (not shown), and to the downstream detector bank 114 via a second plurality of transmission channels 112. Furthermore, some or all individual detectors within each bank are in operable communication with each other via links 301-304. In one variant, the links 301-304 are effected via transmission channels that are similar to the channels 112. In another approach, links 301-304 are implemented via a simple communication channels, such as side band channels, etc. In yet another implementation, the channels delivering inhibition signals between detectors (such as the channels 301, 302) are implemented differently compared to the transmission channels (such as the channels 112).

Depending on a specific implementation, different detectors of the detection apparatus 300 are linked via a one way link (302, 304) or a two way link (301, 303). These can span immediate nodes (for example links 301, 302) or distant nodes (303, 304). Many other topographies (such as one-to-all, etc.) will be readily recognized and implemented by one of ordinary skill when provided the present disclosure, and are equally compatible with the present invention. The links 301-304 are used by the nodes to transmit and receive detector inhibition according to any of the mechanisms described in detail below.

As described above with respect to FIG. 1, each of the detectors 110_1, 110_n contains logic (configured to recognize a predetermined pattern of pulses in the encoded signal 106, and to produce detection output signal transmitted over the communication channels 112.

Each of the detectors within the upstream detector bank 110 generates detection signals (with appropriate latency) that propagate with different conduction delays on channels 112_1, 112_n to detectors of the downstream detector bank 114. The detector cascade of the embodiment of FIG. 3 may contain any practical number of detector nodes and detector banks determined, inter alia, by the software/hardware resources of the detection apparatus and complexity of the objects being detected.

In one implementation, the detector apparatus 300 comprises a few detector nodes (for example less than 10) each node is configurable to inhibit any other node. In another implementation (comprising a large number of nodes) each detector node is configured to inhibit a smaller subset (typically 5-10) of neighboring nodes.

A wide variety of competition mechanisms are applicable and useful with the present invention. For example, one approach, commonly referred to as the "winner take all" (WTA), allows only a single detector (for example detector 110_1 of FIG. 3) to report detection of the specific object. This is achieved by, inter alia, sending of a control (inhibition) signal from the detector 110_1 (the node that is the first to detect the object) to all other detectors (for example detectors 110_2-110_n) for over the links 301, 303 to prevent detection signal generation by other nodes.

Another generally similar approach, commonly referred to as the "hard" inhibition, impedes object detection by one group of the nodes while leaving the remaining detectors unaffected.

Yet another approach, commonly referred to as the "soft" inhibition, impedes object detection by the other nodes while still allowing generation of the detection signals. In one implementation, such inhibition is effected via an increase of the detection threshold of the second nodes. In another implementation, an additional delay is used to delay detection signal output from the secondary nodes. In the latter case, it is possible that two or more detector nodes report the same object of interest. However, the responses by the secondary nodes are delayed with respect to the primary node response. In still another approach, node inhibition is configured to reduce the magnitude of the detection pulse generated by the secondary node. A combination of the above and or similar approaches may also be used consistent with the present invention.

In one implementation of the invention, the inhibition remains in effect until the arrival of the next pulse group (frame). In another implementation, the nodes remain inhibited for more than one frame. It is appreciated by those skilled in the art that many other inhibition schemes are equally compatible and useful with the present invention, such as a combination of hard/soft inhibition rules configured over varying time periods (for example, some nodes are soft inhibited over a first number of frames, while other nodes are hard inhibited over a second number of frames). In one variant, inhibition of one detector (for example 110_1 in FIG. 3) by another detector (for example 110_2 in FIG. 3) is configured to diminish exponentially over time. Such inhibition configuration allows the 110_1 detector to respond to a particular object once the inhibition signal drops below a certain threshold. The inhibition level is maintained above the threshold by periodic transmissions of the inhibition signal by the detector 110_2.

In one embodiment, shown and described with respect to FIG. 3A below, a node that is inhibited to respond to representations of a first object, responds to views of other objects. For example, consider an input sequence of frames containing representations of object A, frequently followed by representations of object B. A detector (such as, for example, the detector 335 in FIG. 3A) that detects input pattern relating to object A also learns to detect object B by mechanisms above. The input frame sequence further contains representations of objects C, D, E, F, and G, which are not detected by the detector 335 (for example, due to having a less pronounced temporal structure compared to the representations of objects A and B). However, a second detector (such as, for example, the detector 336 in FIG. 3A) that is inhibited by the detector 335 from responding to representations of objects A and B is adjusted to respond to the representation of object C.

Another approach combines multiple node inhibition with the long-term modulation of transmission channels described supra. This approach advantageously allows adjustment of dynamic parameters (gain, transmission delay, detection pulse amplitude and timing, etc.) of individual detectors and transmission channels given the appropriate input frames (also referred to as the "training" input or cycle). Upon performing a training cycle, the object detection apparatus becomes responsive to a certain set of objects, each response being invariant to temporally proximate views of the objects.

Figure 3A:
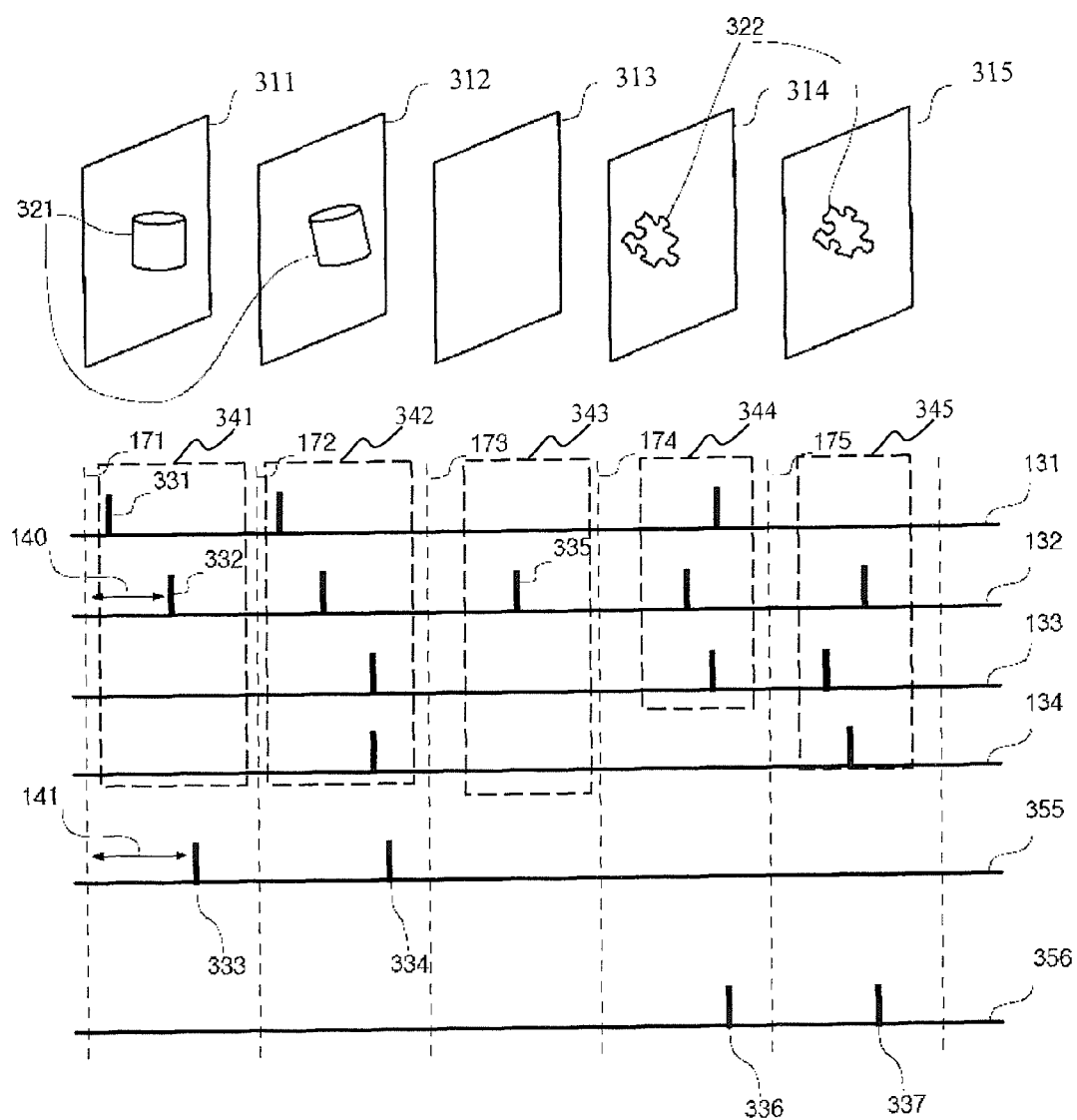
FIG. 3A is a graphical representation illustrating mutual inhibition between two detector nodes in response to a signal representative of different objects according to a first embodiment of the invention.

Referring now to FIG. 3A, an exemplary embodiment of multiple object recognition apparatus 300 utilizing hard mutual inhibition is depicted. The apparatus 300 is configured to receive a sequence of input frames 301-305. Some of the input frames (301-302, 304-305) contain representations of one of two objects (321, 322) separated by one or more frames (such as the frame 303, also referred to as the blank frame) where there the objects 321, 322 are not present. Such situations occur frequently in the physical world where objects do not suddenly change into one another, instead appearing consecutively in series of consecutive frames interleaved by blank frames. Although a single blank frame 303 is shown in FIG. 3A, several blank frames may be present in the input sequence of frames. Furthermore, in one variant (not shown), blank frames contain representations of objects other than the objects 321, 322.

The temporal separation of objects as shown in FIG. 3A allows the apparatus to distinguish between different objects and to report the detection via different detectors. In such case, the increased excitability of detector 355 which responds to the first object 321 decays over the duration of the blank frame 313 (or a plurality of blank frames in general) and by the time the second object 322 appears in frame 314, it is less likely to be confused with the first object 321 by, for example, the detector 355. As a result, the detector 356 has an opportunity to respond to the second object 322. In a situation when representations of two objects frequently and abruptly change into one another (a rare situation in the real world scenes), the detection apparatus respond to both object representations as though it is a single object. In real world scenes, objects typically do not change into each other so abruptly. However, representations of the same object with respect to some transformation (e.g., rotation or scaling) do and this property of input statistics is used by the apparatus to develop an invariant representation.

As shown in FIG. 3A, the objects 321, 322 are being subjected to a rotational transformation. It is appreciated by those skilled in the art that a variety of other transformations are useable and compatible with the present invention, such as was described with respect to FIG. 1A.

Similarly to the embodiment described above with respect to FIG. 1A, the detection apparatus 300 of FIG. 3 includes an encoder module configured to encode each of the input frames 301-305 into a respective pattern (group) of pulses 341-345 that propagate along the transmission channels 131-134. The detection apparatus 300 comprises two (or more) detectors whose activity is depicted by the traces 355, 356, respectively. The detector response trace 355 contains the detection pulses 333, 334 generated in response to receiving the pulse patterns 341, 342, indicating the presence of the object 321 in the frames 301, 302. In one variant, the frame 302 contains a weak representation of the object 321, such as the object moving out of the sensing field or fading away. In one approach (such as described above with respect to FIG. 2A), the detector 355 is configured without learning functionality and it, therefore, does not respond to the pulse pattern 342, because the weaker input is not sufficient to move the detector state sufficiently towards the target set (firing set) S.

In another approach, configured similarly to the embodiment of FIG. 2B or 2C, the detection apparatus 300 is configured to adjust the state of the detector 335 (according to, inter alia, Eqn. 10), and to increase detector excitability upon generation of the detection signal 333 in response to the pulse group 341. This adjustment moves the detector state closer to the target state prior to receipt of the subsequent pulse group 343. Higher detector excitability aids the detector 355 in recognizing the object of interest in the pulse pattern 342, and to cause generation of the detection pulse 334.

The detector apparatus 300 of FIG. 3A further comprises mutual detector inhibition, which his illustrated by the detector response traces 355, 356. As the detector 355 produces detection pulses 333, 334 it prevents the detector 356 from detecting the same object by transmitting an inhibition signal (not shown). This approach advantageously ensures that only a single detector (for example, the detector 355) produces detection output for the specific object (for example, 321).

The blank frame 303 does not trigger detection signal generation by either detector 355, 356 as the frame 303 contains no relevant object representations. The increased susceptibility of the detector node 355 diminishes subsequent to the frame 303.

The frames 304, 305 in FIG. 3 each contain representations of a different object (322), which the detector 356 is configured to recognize. Likewise to the description with respect to the object 321, supra, the detector 356 is configured inhibit responses of the detector 355 as indicated by the absence of the detection pulses in the trace 355 corresponding to the detection pulses 336, 337 generated in response to the frames 304, 305. Such "selective filtering" significantly simplifies operation of downstream detectors (not shown), which no longer need to deal with weaker and/or late detection responses that may be produced by the detector 355 in response to the frames 304, 305, or by the detector 356 in response to the frames 301, 302.

Figure 4:
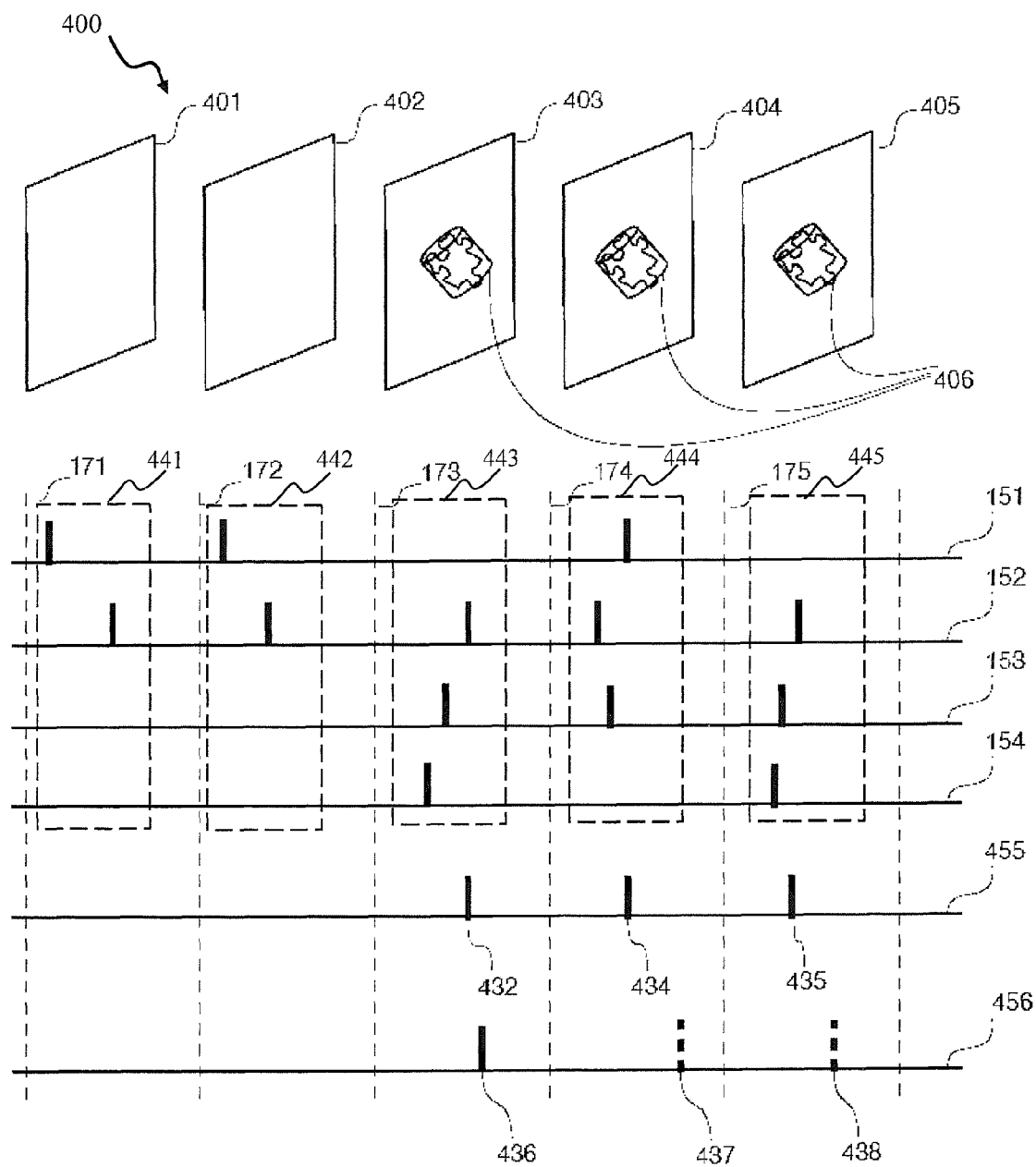
FIG. 4 is a graphical representation illustrating mutual inhibition between two detector nodes in response to a signal comprising a mixture of two objects to according to a second embodiment of the invention.

FIG. 4 illustrates another exemplary embodiment of object recognition apparatus according to the invention. The apparatus 400 is configured to recognize data frames comprising of a mix of two different objects. Similar to the embodiment described above with respect to FIG. 3, the detection apparatus 400 comprises an encoder module configured to encode each of the input frames 401-405 into a respective pattern (group) of pulses 441-445 that propagate along the transmission channels 131-134. The detector apparatus 400 further comprises two detectors whose activity is depicted by the traces 455, 456.

At first, the apparatus 400 receives some number of blank frames (401, 402). The blank frames 401-402 are nevertheless encoded into pulse patterns 441-442. In the exemplary embodiment of FIG. 4, pulse patterns 441-442 include pulses propagating only on channels 151, 152 and neither of the detectors 455, 456 responds to the pulse patterns 441-442. In a different embodiment (not shown), the blank frame comprises the object of interest for a certain detector that is configured to respond to blank frames. Upon processing the pulse group 442, both detectors 455, 456 remain in approximately similar dynamic states, and are described by a comparable excitability to subsequent inputs.

The three subsequent input frames 403-405 in FIG. 4 comprise representations of an object 406 that is a composite of two different sub-objects. In one variant, the sub-objects are the objects 321, 322 of FIG. 3 described above. The frames 402-405 are encoded into the respective pulse groups 443-445. Each of the detectors 455, 456 is configured to detect and respond to representations of the specific sub-object 321, 322, respectively. This is illustrated by the detection pulses 432, 436 generated by the detectors 455, 456, respectively, for example, responsive to the receipt of the pulse group 443.

In FIG. 4, the detector 455 is the primary node, as it is first to generate the detection response (the pulse 432 occurs prior to the pulse 436). The primary node prevents the secondary node (the detector 456) from generating subsequent detection responses to the same object representation (subsequent potential responses are denoted by dashed pulses 435, 438), even though the corresponding input frames contain representation of the sub-object 322. The inhibition feature of the detection apparatus 400 ensures that only the detector 455 generates the detection signal 434, 435 in response to the composite object 406 represented in frames 404, 405. The apparatus 400 in such case reports only the object of interest on the channel corresponding to the detector 455 while suppressing reporting of the presence of the other features. Once the detectors of the apparatus 400 detect the object of interest, they in effect become "specialized detectors" that keep responding to various representations of that object.

In one variant (not shown), small variations within input frames (such as noise, or frame displacement) may cause the detector 456 to become the primary node by responding first to the pulse group 443. In this implementation, the primary node inhibits other detectors (the detector 455) from producing detection signals for the subsequent frames.

Channel or detector adjustment, on the other hand, is in the illustrated embodiment configurable to last over longer periods of time. In one implementation, channel long-term modulation persists over several hundreds or thousands of frame sequences (such as frame sequence described with respect to FIG. 1A supra). In another implementation, $t_{mod}$ is greater than 1000 frames at 24 fps.

There are three relevant time scales that are relevant to the exemplary embodiment of the invention: (i) the dynamics of detectors (the shortest scale), (ii) the transformation time scale (where we have temporal proximity), and (iii) the long time scale, in which the system can adjust its parameters to better detect object. Detector adjustments are transient in all cases; that is, they span only a few frames (1-10). The inhibition may last from under 1 frame (on the order of 20 ms) up to a few frames.

The intermediate time scale embodiments of the invention implement an increased excitability; i.e., once an object has been detected, it is more likely to be reported in the subsequent frame. In the long time scale this means that if statistically frame A is often followed by frame B, the detector will learn to report frame B even if it only reported frame A in the beginning. One aspect of the present invention is that this functionality can be achieved by pulse timing dependent plasticity alone, provided that on the intermediate time scale there is an increased excitability period.

Channel modulation may be transient as well (sometimes referred to as "short-term plasticity"), which can implement increased susceptibility as described above. Long-term channel modulation (colloquially "learning") works on slower time scales. In fact, the slight changes to the channel gain may appear frequently or even constantly, but it will take anywhere from hundreds up to tens of thousands of frames to actually change the gain from zero to some maximum allowed value. Transient changes (short term plasticity) and long term modulation (learning) may work together, that is one could influence the dynamics of the other. For example the short term gain modulation may be proportional to the long term gain, in which case weak channels are allowed only weak transient effects. Other solutions where in general the short term modulation is a function of parameters of channel determined by long term learning are also possible.

Exemplary Uses and Applications of Certain Aspects of the Invention

Pulse coded representations advantageously allow for a very high representation capacity in an object recognition apparatus, as compared to rate encoding. This is due to, inter cilia, invariant properties of pulse encoding which produces the same encoding (invariant output) for many different representations of the object (input). Additionally, by simultaneously connecting a single detector to several encoders (and other detectors), the same detector can receive and process signals representing different objects, thereby effecting resource reuse while increasing processing throughput. Advantageously, the detectors of the network are dynamically reused, wherein some or all detectors are a part of many "detection sequences"; i.e. cascades of pulses going through that system. In one variant of the invention, signal representation throughout the detector cascade is uniformly configured. That is, detector output is of the same form the input, therefore allowing dynamic detector network configuration without the need for supplementary signal conditioning.

An object detection apparatus equipped with long-term channel modulation based on pulse timing plasticity, as discussed above, offers a competitive mechanism that enables some of the detectors to specialize in certain objects of interest. In such case, the specialized detector responds much more quickly (compared to the non-specialized detectors) to input patterns of interest, leaving other detectors inactive by the use of an inhibition mechanism. In another approach, some of the detectors are left unspecialized, thus providing redundancy in the detector network.

The foregoing descriptions of the invention are intended to be illustrative, and not in any way limiting; those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above. These improvements advantageously translate into a system that requires fewer detectors and fewer processing units, compared to the prior art, and that allows taking advantage of the combinatorial richness of the pulse code.

The use pulse timing dependent plasticity, where subsequent dynamics of detectors and transmission channels is determined based in part on a prior activity and/or prior input, enables the detector apparatus to adapt its configuration (learn) and to develop invariant recognition properties through learning and adaptation.

Advantageously, exemplary embodiments of the present invention are useful in a variety of devices including without limitation prosthetic devices, autonomous and robotic apparatus, and other electromechanical devices requiring object recognition functionality. Examples of such robotic devises are manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), etc.

Embodiments of the present invention are further applicable to a wide assortment of applications including computer human interaction (e.g., recognition of gestures, voice, posture, face, etc.), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

Advantageously, the present invention can be used to simplify tasks related to motion estimation, such as where an image sequence is processed to produce an estimate of the object position (and hence velocity) either at each points in the image or in the 3D scene, or even of the camera that produces the images. Examples of such tasks are: ego motion, i.e., determining the three-dimensional rigid motion (rotation and translation) of the camera from an image sequence produced by the camera; following the movements of a set of interest points or objects (e.g., vehicles or humans) in the image sequence and with respect to the image plane.

In another approach, portions of the object recognition system are embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed:

1. Apparatus configured for object recognition, the apparatus comprising:
   a receiving module configured to receive a first plurality of frames relating to an object undergoing a transformation;
   an encoder configured to encode at least a portion of a frame within the first plurality of frames into a group of pulses; and
   at least one detector in communication with the encoder and configured to receive the group of pulses, and to generate a first signal based at least in part on the group of pulses;
   wherein:
      at least a subset of the first plurality of frames comprises a plurality of views of the object undergoing the transformation;
      the apparatus is configured to recognize the object in a view of the plurality of views invariantly with respect to the transformation;
      the at least one detector is adjustable from a first regime to a second regime responsive to a second signal;
      the second signal comprises a detection signal generated in response to a first frame of the first plurality of frames; and
      the first regime comprises a first excitability parameter of the at least one detector and the second regime comprises a second excitability parameter of the at least one detector, the second excitability parameter being different than the first excitability parameter at least until a second frame of the first plurality of frames is received, the second frame being generated subsequent to the first frame of the first plurality of frames.

2. The apparatus of claim 1, wherein the first and the second excitability parameters are configured to effect an excitability of the at least one detector.

3. The apparatus of claim 1, wherein the at least one detector is further configured to be adjusted from a third regime to a fourth regime based at least in part on a second detection signal, the second detection signal being generated responsive to a second plurality of frames, the second plurality of frames temporally preceding the first plurality of frames.

4. The apparatus of claim 3, further comprising:
   a plurality of transmission channels coupled between the at least one detector and the encoder; and
   logic configured to adjust at least one of the plurality of transmission channels from a first scheme to a second scheme based at least in part on the second detection signal being generated.

5. Apparatus configured for object recognition, the apparatus comprising:
   a receiving module configured to receive a first plurality of frames relating to an object undergoing a transformation;
   an encoder configured to encode at least a portion of a frame within the first plurality of frames into a group of pulses; and
   at least one detector in communication with the encoder and configured to receive the group of pulses, and to generate a first signal based at least in part on the group of pulses;
   wherein:
      at least a subset of the first plurality of frames comprises a plurality of views of the object undergoing the transformation;
      the apparatus is configured to recognize the object in a view of the plurality of views invariantly with respect to the transformation;
      the at least one detector is adjustable from a first regime to a second regime responsive to a second signal;
      the second signal comprises a detection signal generated in response to a first frame of the first plurality of frames;
      the first regime comprises a first excitability parameter of the at least one detector and the second regime comprises a second excitability parameter of the at least one detector, the second excitability parameter being different from the first excitability parameter at least until a second frame of the first plurality of frames is received, the second frame being generated subsequent to the first frame of the first plurality of frames; and
      the at least one detector is further configurable to be adjusted from a third regime to a fourth regime based at least in part on a second detection signal, the second detection signal being generated responsive to a second plurality of frames, the second plurality of frames temporally preceding the first plurality of frames.

6. The apparatus of claim 5, wherein the at least one detector communicates with the encoder via a plurality of transmission channels; and
   the apparatus further comprises logic configured to adjust at least one of the plurality of the transmission channels from a first scheme to a second scheme responsive to an arrival of at least one pulse of the group of pulses at the at least one detector via the at least one of the plurality of transmission channels within a first interval relative to the first signal, such that the adjustment from the first scheme to the second scheme is configured based at least in part on the first interval.

7. The apparatus of claim 5, wherein the first and second excitability parameters are configured to effect an excitability of the at least one detector.

8. The apparatus of claim 5, further comprising:
   a plurality of transmission channels coupled between the at least one detector and the encoder; and
   logic configured to adjust at least one of the plurality of transmission channels from a first scheme to a second scheme based at least in part on the second detection signal being generated.

9. Apparatus configured for object recognition, the apparatus comprising:
   a receiving module configured to receive a first plurality of frames relating to an object undergoing a transformation;
   an encoder configured to encode at least a portion of a frame within the first plurality of frames into a plurality of pulses;
   at least one detector in communication with the encoder over a plurality of transmission channels configured to communicate individual ones of the plurality of pulses, the at least one detector configured to generate a first signal based on the plurality of pulses; and
   logic configured to adjust at least one of the plurality of the transmission channels from a first scheme to a second scheme responsive to an arrival of at least one pulse of the plurality of pulses at the at least one detector within a first interval relative to the first signal, such that the adjustment from the first scheme to the second scheme is configured based at least in part on the first interval;

wherein:
at least a subset of the first plurality of frames comprises a plurality of views of the object undergoing the transformation;
the apparatus is configured to recognize the object in a view of the plurality of views invariantly with respect to the transformation;
the at least one detector is adjustable from a first regime to a second regime responsive to a second signal;
the second signal comprises a detection signal generated in response to a first frame of the first plurality of frames; and
the first regime comprises a first excitability parameter of the at least one detector and the second regime comprises a second excitability parameter of the at least one detector, the second excitability parameter being different from the first excitability parameter at least until a second frame of the first plurality of frames is received, the second frame being generated subsequent to the first frame of the first plurality of frames.

10. The apparatus of claim 9, wherein the first and second excitability parameters are each characterized by a respective sensitivity of the at least one detector.

11. The apparatus of claim 9, wherein the first and the second excitability parameters are configured to effect an excitability of the at least one detector.

12. The apparatus of claim 9, wherein the first scheme is characterized by a first channel gain and the second scheme is characterized by second channel gain; and
the second channel gain is greater than the first channel gain responsive to the least one pulse arriving to the at least one detector prior to the first signal.

13. The apparatus of claim 9, wherein the second scheme is different from the first scheme for a duration that is at least an integer multiple longer than a time period corresponding to two consecutive frames of the first plurality of frames.

14. The apparatus of claim 9, wherein:
the at least one detector is further configured to be adjusted from a third regime to a fourth regime based at least in part on a second detection signal; and
the third regime comprises a third excitability parameter of the at least one detector and the fourth regime comprises a fourth excitability parameter of the at least one detector, the second detection signal being generated responsive to a second plurality of frames, the second plurality of frames temporally preceding the first plurality of frames.

15. An apparatus comprising:
an encoder configured to receive a first plurality of views of an object undergoing a transformation and to encode at least a portion of a first view of the first plurality of views into a group of pulses; and
a first detector configured to generate a detection signal based at least in part on receiving the group of pulses;
wherein:
the first detector is adjustable from a first regime to a second regime responsive to a receipt of a pulse of the group of pulses;
the apparatus is configured to recognize the object in the first view of the first plurality of views invariantly with respect to the transformation;
the detection signal is generated in response to the first view of the first plurality of views; and
the first regime comprises a first excitability parameter of the first detector and the second regime comprises a second excitability parameter of the first detector, the second excitability parameter being different from the first excitability parameter at least until a second view of the first plurality of views is received, the second view being received subsequent to the first view of the first plurality of views.

16. An apparatus comprising:
an encoder configured to receive a first plurality of views of an object undergoing a transformation and to encode at least a portion of a first view of the first plurality of views into a group of pulses;
a first detector configured to generate a detection signal based at least in part on receiving the group of pulses;
a plurality of channels coupled between the first detector and the encoder; and
logic configured to adjust at least one of the plurality of channels from a first scheme to a second scheme responsive to an arrival of at least one pulse of the group of pulses at the first detector via the at least one of the plurality of channels within a first time interval relative to the detection signal, such that the adjustment from the first scheme to the second scheme is configured based at least in part on the first time interval:
wherein:
the first detector is adjustable from a first regime to a second regime responsive to a receipt of a pulse of the group of pulses;
the apparatus is configured to recognize the object in the first view of the first plurality of views invariantly with respect to the transformation;
the detection signal is generated in response to the first view of the first plurality of views; and
the first regime comprises a first excitability parameter of the first detector and the second regime comprises a second excitability parameter of the first detector, the second excitability parameter being different than the first excitability parameter at least until a second view of the first plurality of views is received, the second view being received subsequent to the first view of the first plurality of views.

17. The apparatus of claim 16, wherein the first and second excitability parameters are each characterized by a respective sensitivity of the first detector.

18. The apparatus of claim 16, wherein:
the first scheme is characterized by a first channel gain and the second scheme is characterized by a second channel gain; and
the second channel gain is smaller than the first channel gain responsive to the least one pulse arriving to the first detector after the detection signal.

19. The apparatus of claim 16, wherein:
the adjustment of the at least one of the plurality of channels is configured based on a second detection signal, the second detection signal being generated responsive to a second plurality of views, the second plurality of views temporally preceding the first plurality of views.

20. The apparatus of claim 19, wherein the adjustment of the at least one of the plurality of channels is effected responsive to generation of the second detection signal.

21. The apparatus of claim 20, wherein the second scheme is configured based at least in part on (i) a receiving activity; and (ii) the generation of the detection signal, the receiving activity and the generation of the detection signal integrated over a time period that is longer than a time interval corresponding to two consecutive frames.

22. The apparatus of claim 16, further comprising a second detector, wherein the first detector is configurable to be adjusted from a third regime to a fourth regime responsive to a signal associated with the second detector.

23. The apparatus of claim 22, wherein the fourth regime is configured based at least in part on a value associated with the signal, the fourth regime comprising one of: (i) a detection inhibition regime, and (ii) a detection enhancement regime.

24. A method for use in a computerized apparatus configured to process a first plurality of frames comprising views of an object undergoing a transformation, the first plurality of frames being received by a detector apparatus in communication with a plurality of channels, the method comprising:
generating a detection signal responsive to receiving a first group of pulses via the plurality of channels, the first group associated with a first view of the object;
adjusting at least one of the channels from a first scheme to a second scheme responsive to the detection signal; and
adjusting the detector apparatus from a first regime to a second regime responsive to a signal;
wherein:
the generating and adjusting cooperate to effect recognition of the object in the first view invariantly with respect to the transformation;
the signal comprises the detection signal being generated responsive to a first frame of the first plurality of frames; and
the first regime comprises a first excitability parameter of the detector apparatus and the second regime comprises a second excitability parameter of the detector apparatus, the second excitability parameter being different from the first excitability parameter at least until a second frame of the first plurality of frames is received, the second frame being received subsequent to the first frame of the first plurality of frames.

25. The method of claim 24, wherein the first and the second excitability parameters are configured to effect an excitability of the detector apparatus.

26. The method of claim 24, wherein the first scheme is characterized by a first channel gain and the second scheme is characterized by second channel gain; and
the second channel gain is greater than the first channel gain responsive to the least one pulse arriving to the detector apparatus prior to the detection signal.

27. The method of claim 24, further comprising adjusting at least one of the plurality of the channels from a third scheme to a fourth scheme responsive to an arrival of at least one pulse of the group of pulses at the detector apparatus via the at least one of the plurality of channels within a first interval relative to the signal, such that the adjusting from the first scheme to the fourth scheme is configured based at least in part on the interval.

28. The method of claim 24, further comprising adjusting the detector apparatus from a third regime to a fourth regime based at least in part on a second detection signal, the second detection signal being generated responsive to a second plurality of frames relating to the object undergoing the transformation;
wherein the second plurality of frames temporally precede the first plurality of frames; and
wherein the third regime comprises a third excitability parameter of the detector apparatus and the fourth regime comprises a fourth excitability parameter of the detector apparatus.

29. The method of claim 24, wherein the detector apparatus comprises a first detector and a second detector; and
the first detector is configured to be adjusted from a third regime to a fourth regime responsive to a signal associated with the second detector.

30. The method of claim 29, wherein the fourth regime is configured based at least in part on a value associated with the signal, the fourth regime comprising one of: (i) a detection inhibition regime, and (ii) a detection enhancement regime.

31. A method for use in a computerized apparatus configured to process a first plurality of frames comprising views of an object undergoing a transformation, the first plurality of frames being received by a detector apparatus in communication with a plurality of channels, the method comprising:
generating a detection signal responsive to receiving a first group of pulses via the plurality of channels, the first group of pulses associated with a first view of the object;
adjusting at least one of the channels from a first scheme to a second scheme responsive to the detection signal;
adjusting the detector apparatus from a first regime to a second regime responsive to a signal; and
adjusting the detector apparatus from a third regime to a fourth regime based at least in part on a second detection signal, the second detection signal being generated responsive to a second plurality of frames relating to the object undergoing the transformation;
wherein:
the generating and adjusting cooperate to effect recognition of the object in the first view invariantly with respect to the transformation;
each of the regimes is characterized by a respective excitability parameter of the detector apparatus; and
the second plurality of frames temporally precede the first plurality of frames.

32. The method of claim 31, wherein:
the first regime is characterized by a first excitability parameter of the detector apparatus and the second regime is characterized by a second excitability parameter of the detector apparatus, the second excitability parameter being different from the first excitability parameter at least until a second frame of the first plurality of frames is received, the second frame being received subsequent to the first frame of the first plurality of frames.

33. The method of claim 32, wherein the first excitability parameter and the second excitability parameter are configured to effect an excitability of the detector apparatus.

34. The method of claim 31, wherein:
the detection apparatus comprises a first detector and a second detector; and
the adjusting from the third regime to the fourth regime is configured based on a signal associated with the second detector.

35. The method of claim 34, wherein the fourth regime is configured based at least in part on a value associated with the signal, the fourth regime comprising one of: (i) a detection inhibition regime, and (ii) a detection enhancement regime.

* * * * *